Figure 3B:
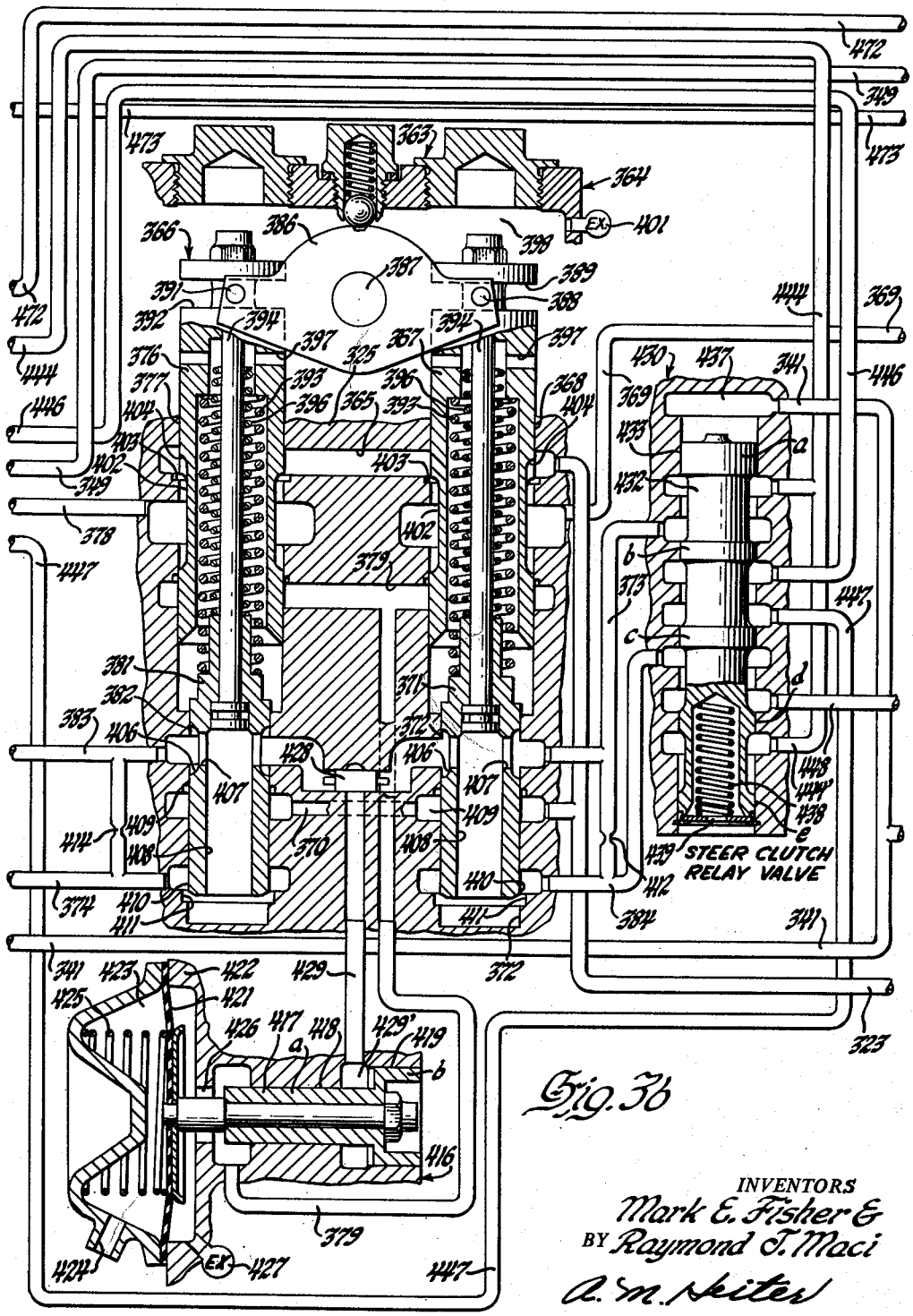

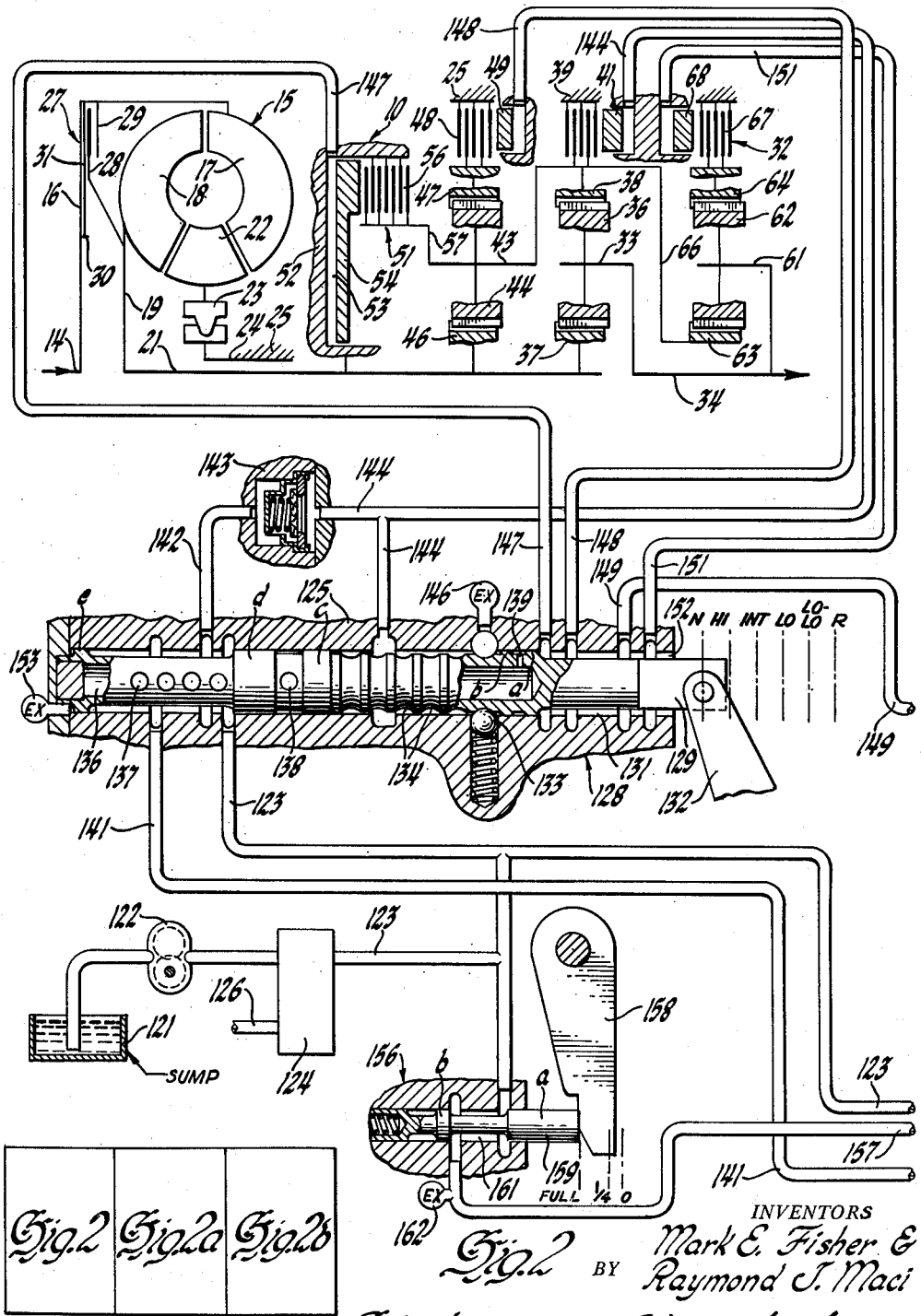

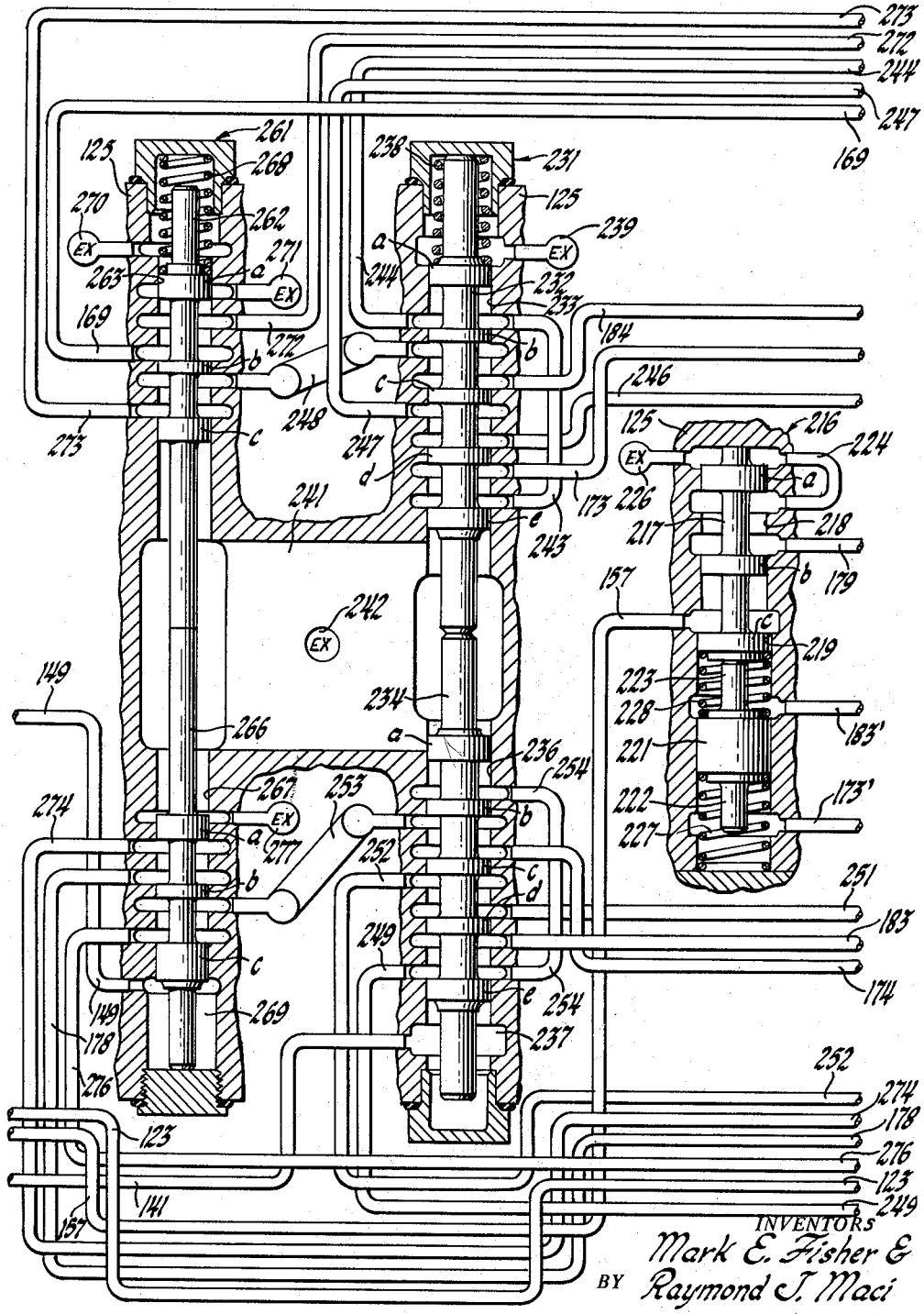

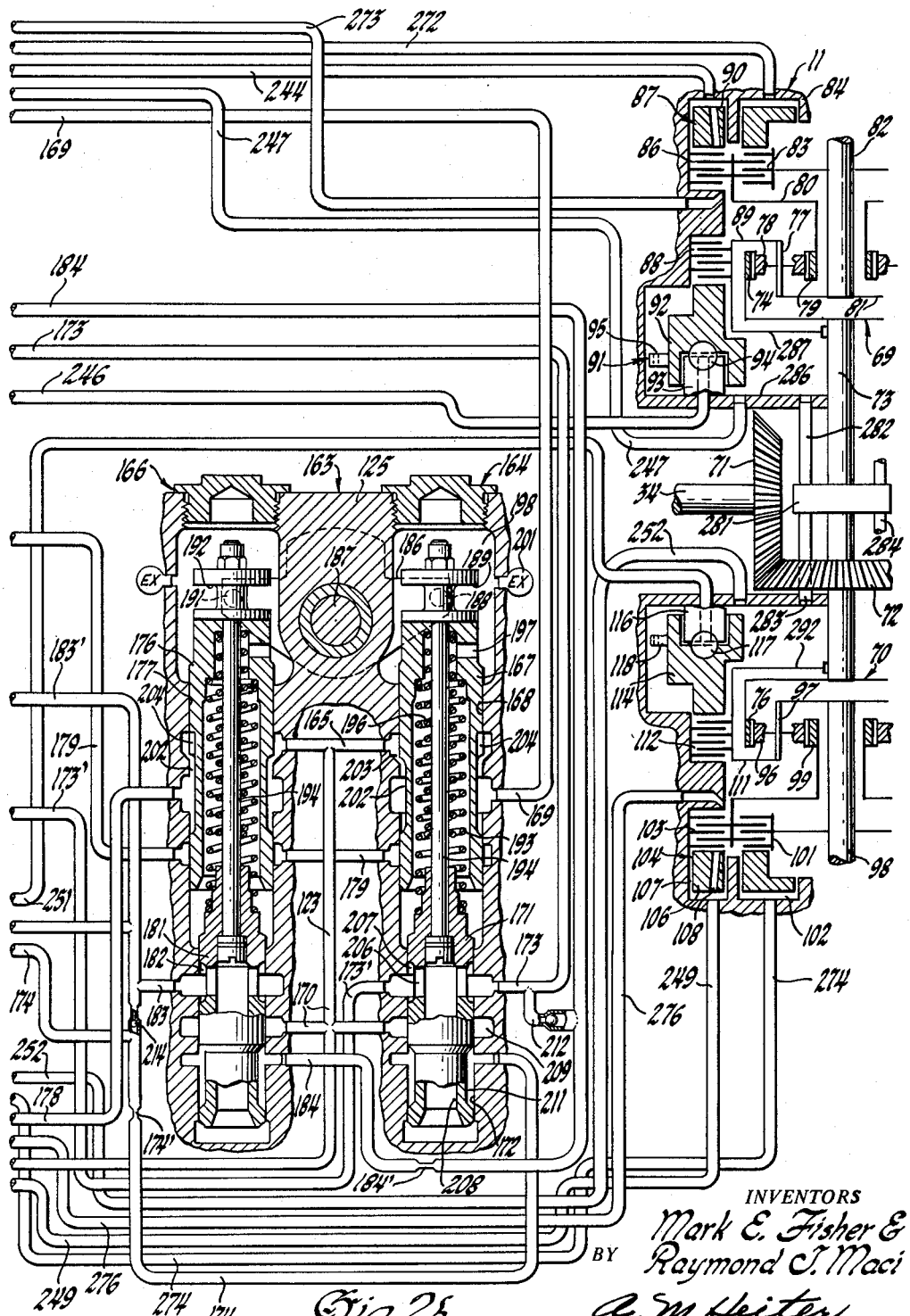

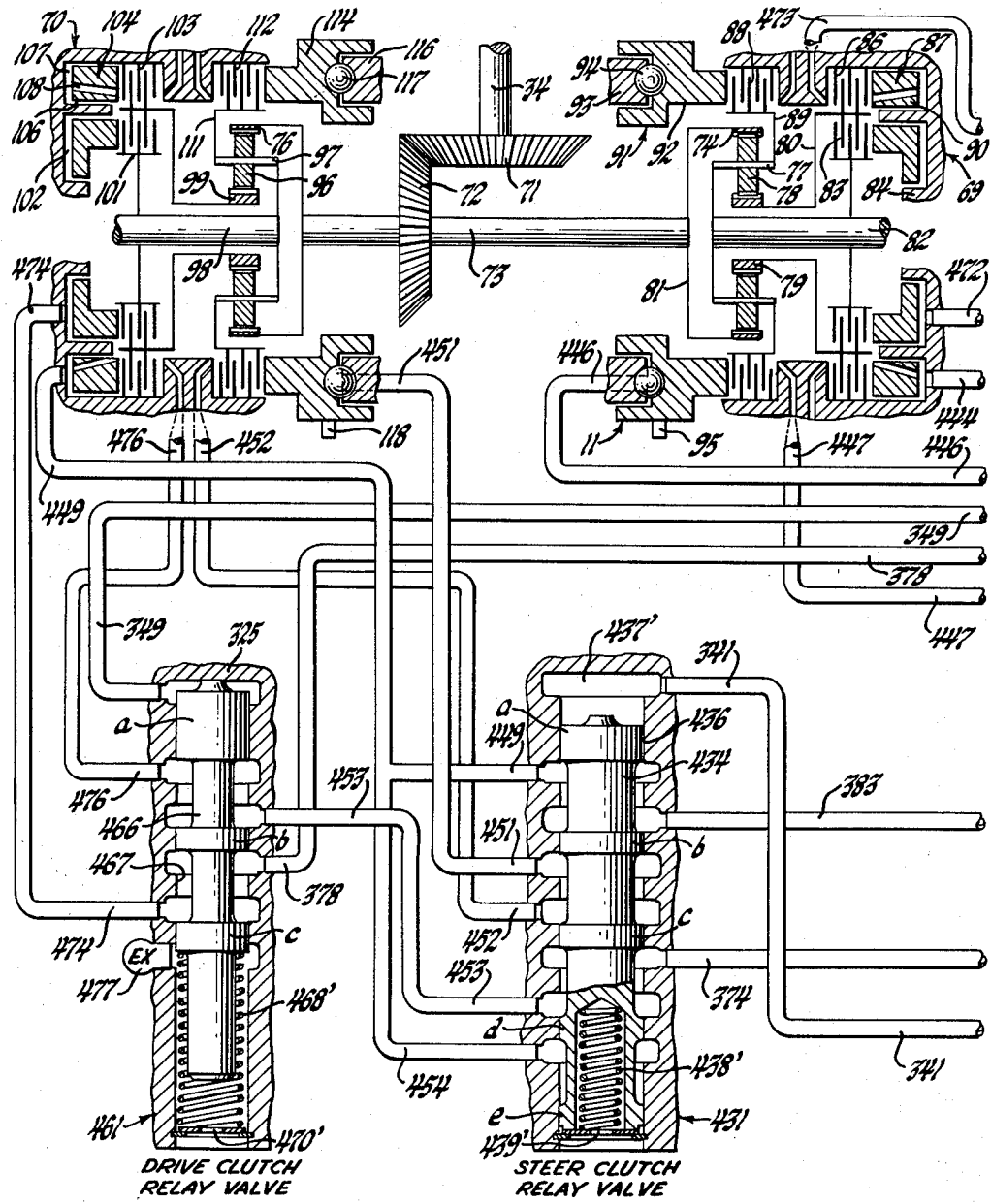

March 23, 1965 M. E. FISHER ETAL 3,174,362
TRANSMISSION
Filed May 26, 1960 7 Sheets-Sheet 6
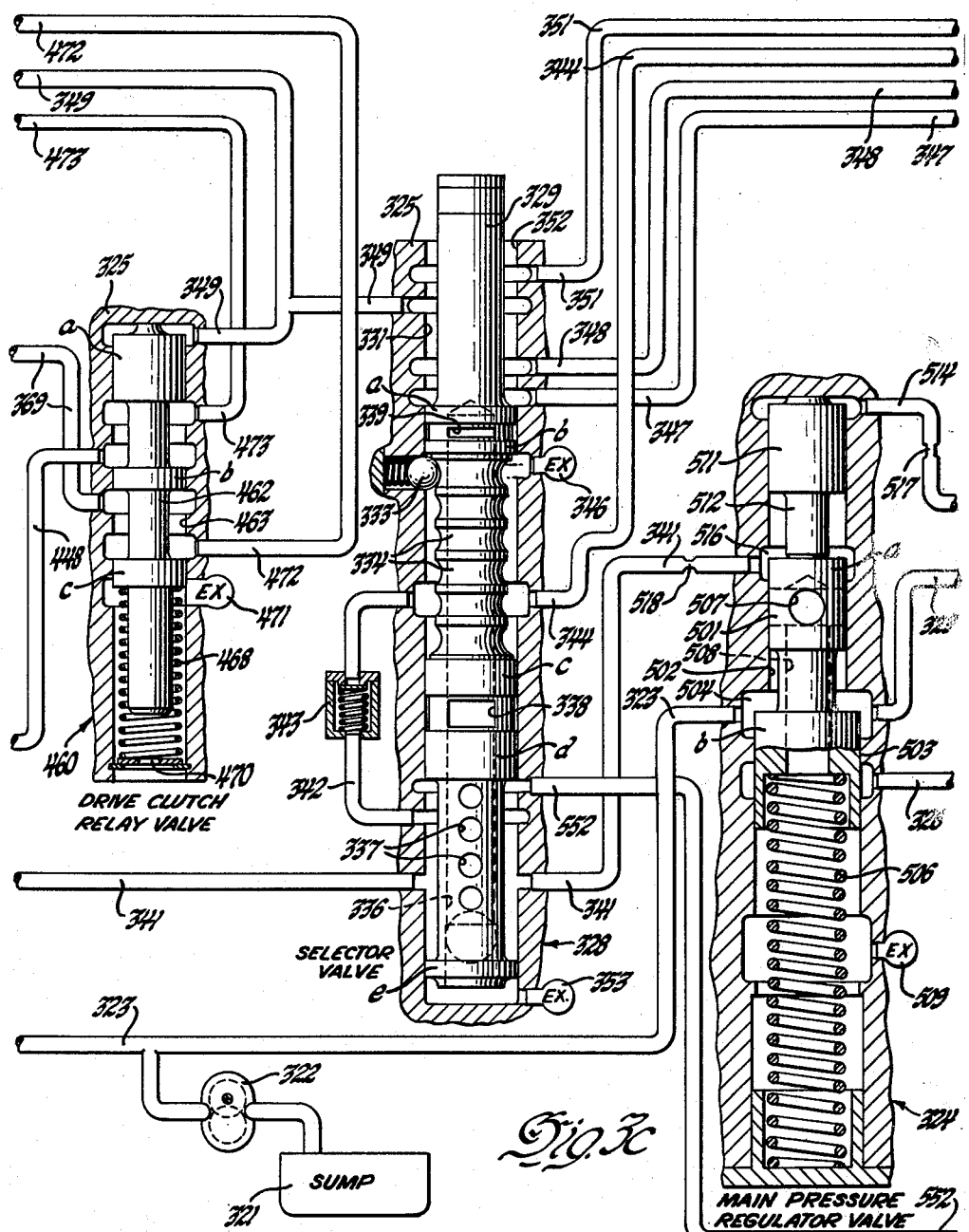
INVENTORS
Mark E. Fisher &
BY Raymond J. Maci
A. M. Heiter
ATTORNEY

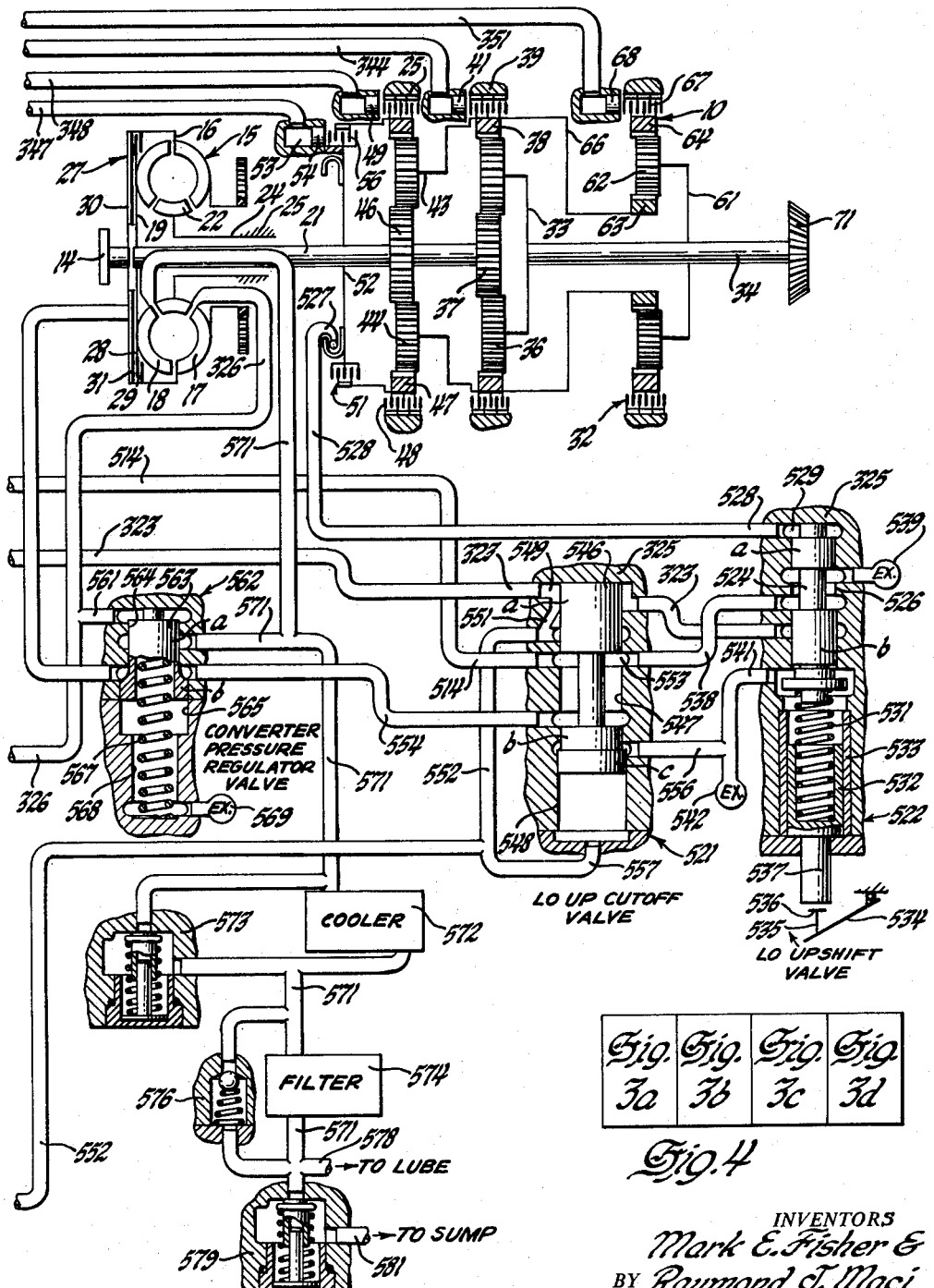

3,174,362
TRANSMISSION

Mark E. Fisher, Carmel, and Raymond J. Maci, Indianapolis, Ind., assignors to General Motors Corporation, Detroit, Mich., a corporation of Delaware
Filed May 26, 1960, Ser. No. 32,039
41 Claims. (Cl. 74—720.5)

This invention relates to transmission particularly cross drive transmission and steering controls.

The invention relates to cross drive transmission of the type employing a multiratio drive connected through a cross drive transmission unit to drive the tracks or other traction or propulsion mechanism of the vehicle in each of a plurality of straight forward or reverse drives and steering drives. We preferably provide a multiratio transmission unit to provide a plurality of forward and reverse drives for straight forward drive and a cross drive transmission unit to provide supplemental straight forward drive ratios and to selectively control the drive ratio to either the right or left track and to disengage the drive and retard track to provide either geared steer or clutch brake steer in each drive. The multiratio unit is employed to connect the engine to a cross drive unit in a plurality of ratios in order to provide proper torque multiplication between the engine and the vehicle drive wheels for proper engine operation and to vary the speed of the vehicle. The cross drive unit includes right and left transmission gear, clutch and brake units to selectively provide variation in either or both of the right and left drive ratios for geared steer or to disconnect or declutch and brake either the right or left drive in order to provide clutch brake steer. In addition, the right and left gear units of the cross drive unit may be simultaneously shifted from one to another ratio to provide an additional drive ratio to supplement the torque multiplication of the multiratio transmission unit.

This invention is illustrated in a cross drive transmission having a multiple ratio unit consisting of a torque converter and lockup clutch through which the drive may be alternately transmitted and a three-speed forward and one-speed reverse gear unit. The cross drive unit has a right and a left two ratio gear unit each providing neutral, under drive and direct drive to one output shaft or track of the vehicle and a right or left brake mechanism to retard either or both output shafts. The controls are arranged so that low, intermediate, high and reverse gear ratios may be provided in the multiple ratio unit to provide three forward drives and one reverse drive. In addition, these ratios are employed in combination with the direct or high ratio drive of the cross drive unit to provide the normal operating gear ratios. However, in addition to these drive ratios, a low low drive is provided which employs in combination with low of the multiratio gear unit, the reduction or low drive of the cross drive unit as an emergency low drive or low low drive. Braking may be obtained by simultaneous application of the output shaft brakes. When the transmission is operating in either high or intermediate ratio, this ratio is engaged in the multiratio unit and direct drive is engaged in both the right and left-hand gear units of the cross drive unit for straight drive. When the steering controls are moved, for example, to the right to effect right steer, the right cross drive unit is automatically down-shifted from direct drive to low drive. This shift may be partially made by slipping the low cross drive ratio friction engaging device to obtain partial or a controlled degree of steering. Full engagement of low ratio in the right unit will effect a predetermined geared steer to the right. In low and reverse ratios, the multiratio unit is in either low or reverse ratio and the cross drive unit is initially in direct drive. By moving the steering controls to the right, for example, the right direct drive is disengaged to provide neutral and the right brake is applied to provide right clutch brake steer in the desired degree from partial steer to pivot steer. When the manual ratio control is placed in the low low ratio, the multiratio unit is in low ratio and the cross drive units are both in low ratio. Then on steering, for example to the right, the right low drive is disengaged to provide neutral and the right brake is engaged to provide clutch brake steer to the desired degree.

The control system automatically provides the above drive ratio control and steering control program in response to the operator's control of only two controls, the manual ratio control and the steering control. The ratio control actuates the manual selector valve which selects the desired ratio in the multiratio transmission unit in each ratio and in addition provides signal pressures to condition the steering controls to provide the proper ratios in the cross drive unit. The cross drive control consists of a pair of steer valves operated by a single steering control and drive relay valve controls and steer relay valve controls actuated by the signal pressures from the manual selector valve to provide a simple hydraulic control system providing the above drive ratio and steering control program. In one arrangement drive relay and steer relay valves each having portions controlling the right and left cross drive units are preferred to insure simultaneous shifting of right and left control valve parts. In another arrangement individual right and left drive and steer valves provide a more compact and lower cost valve assembly. In addition, these controls provide lubrication and cooling fluid for the clutch and brake drive engaging devices for ratio engaging and the vehicle brake devices of the cross drive unit. A more uniform quantity of flow to the lubrication lines during steering operation is provided by one arrangement by employing one steer valve to control the engagement of the steering friction device and the other steer valve to control the lubrication flow. In another arrangement, the steer valve controlling the supply of pressure to the friction engaging device being engaged for steering also controls and supplies the excess fluid to the lubrication lines.

The steer control valve system is further controlled by a signal indicating that there is a very low or substantially no torque flow from the engine to the load or that there is a reverse torque flow from the load to the engine to hold the drive normally engaged in straight forward drive engagement until either the drive or the brake being engaged for steering drive is engaged sufficiently to prevent malfunction such as reverse steering. In one arrangement the throtle control is employed at very low throttle or torque demand positions at least below one-fourth throttle position to provide a signal indicating low torque demand and low positive torque flow from the engine to the load and continuing during negative torque flow. In another arrangement engine manifold vacuum is employed. Either the high vacuum at very low positive engine torque outputs is employed to provide a signal during very low positive torque and negative torque, or the higher vacuum occurring only during negative torque is employed to provide a signal only during negative torque or coasting.

The multiratio transmission unit has a control system which regulates the converter supply pressure at a lower value when the lockup clutch is engaged. The lockup clutch is also controlled by a transmission speed governor actuated shift valve which engages the lockup clutch when the transmission reaches a predetermined speed. This valve has a further control to vary the lockup speed at the will of the operator or in response to throttle pedal position. The lockup clutch is also disengaged by the lockup cut-off valve in response to each ratio shift of the multiratio gear unit.

An object of the invention is to provide in a cross drive transmission having a forward and reverse drive multiratio unit and a multiratio cross drive unit, a simplified control system providing in one forward ratio geared steering control and in another ratio clutch brake steering control.

Another object of the invention is to provide in a cross drive transmission assembly having a multiratio unit and a cross drive unit providing a plurality of drive ratios, controls providing geared steering in some drive ratios and clutch brake steering in other drive ratios.

Another object of the invention is to provide in a cross drive transmission, a drive mechanism providing a fast drive of the output and a device to reduce the speed of the output, and a control system to provide said fast drive and to reduce the speed of said drive including a device to provide overlap between said fast drive and operation of said device to reduce the speed of said output operating in response to low positive torque transmittal.

Another object of the invention is to provide in a cross drive transmission, a drive mechanism providing a fast drive of the output and a device to reduce the speed of the output, and a control system to provide said fast drive and to reduce the speed of said drive including a torque controlled device to control the degree of overlap between the disengagement of the fast drive and operation of the device to reduce the speed.

Another object of the invention is to provide in a cross drive transmission, a drive mechanism providing a fast drive of the output and a device to reduce the speed of the output, and a control system to provide said fast drive and to reduce the speed of said drive including a device to provide overlap between said fast drive and operation of said device to reduce the speed of said output operating in response to low throttle positions.

Another object of the invention is to provide in a cross drive transmission having a control system to provide a shift from a fast drive to a slower or retarded drive, an engine manifold vacuum controlled device to control the degree of overlap during steering between the fast drive and the retarded drive.

Another object of the invention is to provide a cross drive steering control system having a steering valve varying the delivery of pressure from a source to either a normal drive feed line or a steer feed line in conjunction with relay valves to actuate a cross drive unit for either geared steer or clutch brake steer.

Another object of the invention is to provide a cross drive steering control system having a steering valve varying the delivery of pressure from a source to either a normal drive feed line or a steer feed line in conjunction with right- and left-hand drive relay valves and steer relay valves to actuate the cross drive unit for straight drive, geared steer and clutch brake steer.

Another object of the invention is to provide in a cross drive steering control, a steering valve controlling the delivery of fluid under pressure to actuate the normal drive and to vary the normal drive for steering by the engagement of friction devices and to supply cooling fluid to the friction devices during engagement.

Another object of the invention is to provide in a transmission control system for a transmission having a fluid drive and a lockup clutch, a regulator valve to regulate the pressure of the supply to the fluid drive, and a control responsive to engagement of the lockup clutch to reduce the regulated pressure of the fluid supply to the converter.

Another object of the invention is to provide in a transmission control system, a shift valve biased in one direction by a governor force biased in the opposite direction by a normal spring force and a control system to increase the spring force during the terminal portion of movement of the throttle pedal.

These and other objects of the invention will be more apparent from the following drawings and description of the preferred embodiments of the invention shown in the accompanying drawings in which:

The transmission and the hydraulic control system are shown schematically in FIGS. 2, 2a and 2b, when arranged as indicated by FIG. 1.

The modified transmission and the hydraulic control system are shown schematically in FIGS. 3a, 3b, 3c and 3d arranged as indicated in FIG. 4.

The invention is illustrated in a cross drive transmission having a multiratio drive unit 10 shown in FIGS. 2 and 3d extending longitudinally of the vehicle and a cross drive transmission unit 11 shown in FIGS. 2b and 3a extending transversely of the vehicle. The multiratio unit 10 provides alternatively either torque converter or lockup clutch drive in combination with a manually selected drive which is one of three forward gear ratios—high, intermediate and low—or reverse gear ratio or neutral. The cross drive provides either high or low drive or neutral in either the right or left drive unit to drive either the right or the left output shaft which are connected to the propulsion or traction devices such as the tracks or wheels. Though either high or low drive in the cross drive unit 11 may be provided in conjunction with any drive ratio in the ratio drive unit 10 to provide six forward drives and two reverse drives, it is preferred in order to obtain geared steering in high ratios and clutch brake steer in the low ratios to provide only four forward drive ratios—high, intermediate and low—in the ratio unit 10 in combination with high in the cross drive unit and low in the low drive ratio which combines low in the low ratio unit 10 and low in the cross drive unit 11 and one reverse ratio by combining reverse in the ratio unit 10 and high in the cross drive unit 11. With this forward drive arrangement the preferred control sytem provides in high HI and intermediate INT ratios, geared steer, and in low LO, low low LO-LO and reverse R ratio clutch brake steer.

Since the transmission gear arrangement shown in FIG. 2 and FIG. 3d are substantially the same, the following description refers particularly to the first modification. The gearing has an input shaft 14 driven by the engine which drives the rotatable torque converter housing 16 which carries the pump 17. The torque converter pump 17 has conventional blading which circulates fluid around the torus chamber to drive the turbine 18 which is connected by a hub 19 to the intermediate shaft 21. The torque converter 15 has a stator 22 having suitable blading to redirect fluid from the turbine 18 to pump 17. The stator may be of either one-piece or two-piece construction in accordance with conventional practice and each part connected by a one-way brake or directly connected to the ground sleeve 24 which is fixed to the transmission housing 25. The torque converter housing 16 is filled with fluid so that the torus chamber in which the bladed pump, turbine and stator members operate is filled with fluid to provide torque multiplication in the conventional manner.

The lockup clutch 27 is employed to directly connect the input shaft 14 to the intermediate shaft 21. The clutch 27 is located within the housing 16 and has a driven plate 28 connected to the hub 19 located between a fixed plate 29 supported on the housing 16 and a movable plate 31 formed as a portion of a fluid actuated piston 31 fitting in a cylinder 30 formed in the forward wall of housing 16. Fluid is supplied by the lockup clutch line 554 to the cylinder 30 to move the piston 31 so that the driven plate 28 is engaged between the piston 31 and the fired plate 29 to provide a direct drive between the input shaft 14 and associated housing 16 and the intermediate shaft 21. When pressure is exhausted from the cylinder 30, the torque converter fluid pressure in the housing 16 passes through the hub 19 in which suitable apertures may be provided and acts on the exterior face of the piston 31 to retract the piston and disengage the lockup clutch.

The ratio unit 10 has a three speed and reverse gear unit

32. The carrier 33 of the low speed planetary gear set is connected to the output shaft 34 and rotatably supports a plurality of planetary pinions 36 which mesh with a sun gear 37 driven by the intermediate shaft 21 and a ring gear 38. The ring gear 38 is held stationary to engage low drive by a brake or drive engaging device 39 actuated by the low motor 41. The intermediate planetary gear set has a carrier 43 connected to the ring gear 38 and having planetary pinions 44 meshing with a sun gear 46 driven by the intermediate shaft 21 and a ring gear 47. The ring gear 47 may be held to provide intermediate drive by the intermediate brake or ratio engaging device 48 actuated by the intermediate motor 49. The low and intermediate brakes 39 and 48 and their respective motors 41 and 49 are mounted on the stationary housing 25 and are engaged when fluid is supplied to the motors and are released by suitable retraction springs when fluid is exhausted from the motors. The high ratio clutch 51 has a driving hub 52 driven from intermediate shaft 21. The hub 52 is suitably recessed to provide a cylinder 53 in which the piston 54 operates. Clutch 51 has a plurality of plates 56 with alternate plates splined at their outer radius to the hub 52 and intermediate plates splined at the inner radius to an extension 57 of the carrier 43. When fluid is supplied to cylinder 53, the clutch 51 is engaged to lock carrier 43 to sun gear 46 and thus lock up the intermediate gear set to provide direct drive. Suitable retraction springs release clutch 51. The reverse gear set has a carrier 61 having planetary pinions 62 meshing with a sun gear 63 and a ring gear 64. The sun gear 63 is connected by a disc 66 to the ring gear 38 and reversely drives the carrier 61 when the reverse brake 67 is engaged by the reverse motor 68. Fluid supplied to the reverse motor engages reverse brake 67 which is provided with suitable retraction springs to disengage the reverse brake when the motor is exhausted.

Referring to FIG. 2b it is seen that the output shaft 34 of the ratio gear set 10 has a bevel gear 71 driving a bevel gear 72 on the cross drive shaft 73 connected to the right unit 69 and left unit 70 of the cross drive transmission 11. The shaft 73 drives the right ring gear 74 and a left ring gear 76. The right planetary reduction gear has a carrier 77 having a plurality of planetary pinions 78 meshing with the ring gear 74 and a sun gear 79. The carrier 77 is connected by a disc 81 to the right output shaft 82. To provide high or direct drive the sun gear 79 is connected by connector 80 and the high clutch 83 to the output shaft 82 to lock up the reduction gear set. Clutch 83 is engaged when fluid is supplied to the high clutch motor 84 and released on exhaust by suitable retraction springs. The sun gear 79 is also connected by the connector 80 to the low brake 86 or drive engaging device which is engaged when fluid is supplied to the motor 87. The right low drive motor 87 may also have an apertured piston 90 as explained below in regard to the left low motor 104. The vehicle brake 88 retards the output shaft 82 through disc 89, carrier 77 and disc 81. This vehicle type brake which is employed both as a vehicle service brake, emergency brake and steering brake, is actuated by a motor 91 consisting of an external annular piston 92 and an internal annular cylinder 93 both having contiguous annular surfaces having a plurality of mating ball ramps and balls 94 so that when fluid is supplied to the chamber between the piston and cylinder the piston 92 engages a plate of brake 88 rotating with the output shaft 82 and is rotated. Rotation of the piston 92 through the action of the cams and balls 94 self-energizes the brake. On exhaust of the motor chamber retraction springs retract the brake for disengagement. Piston 92 has an ear 95 connected to a linkage to mechanically apply the brake for emergency use by rotating piston 92 to cause the ramps and balls 94 to provide initial and self-energizing engagement.

At the left side of the cross shaft 73 the ring gear meshes with planetary pinions 96 rotatably mounted on the carrier 97 which is connected to and drives the left output shaft 98. The sun gear 99 of this planetary gear set is connected by the high clutch 101 to the output shaft 98 to lock up the left planetary gear set for high ratio drive. The high clutch motor 102 when supplied with fluid engages the clutch 101 and suitable retraction springs, not shown, contact the motor and disengage the clutch when fluid is exhausted from the motor. The sun gear 99 is also retarded or held stationary by the low brake 103 which is actuated by the low motor 104 consisting of a piston 106 located in a cylinder 107. When fluid is first supplied to the cylinder 107, it flows through the bore 108 to initially provide cooling fluid flow to the plates of brake 103 and then on initial engagement when the first brake plate closes bore 108 extending through the piston 106 cooling flow ceases and the piston is moved quickly into final engagement of brake 103. This cools the brake during initial engagement and provides an initial low pressure for soft initial engagement until the first firm contact and drive and then a rapid pressure rise for final engagement. The carrier 97 is connected by disc 111 to the vehicle brake 112. In order to retard the output shaft 98 the brake 112 is actuated by an external annular piston 114 mounted on a stationary internal annular cylinder 116. The piston and cylinder have on their mating annular surfaces cam ramps cooperating with balls 117 to cam the piston 114 into further engagement when it is rotated by engagement of the first rotating plate of brake 112 which rotates with the output shaft 98. Thus, when fluid is supplied to the cylinder space between the piston 114 and cylinder 116, the piston 114 is moved into light engagement and rotated by the brake plate to provide a self-energizing braking force due to action of the cam ramps and cam balls 117. The piston 114 also has an ear 118 which may be connected to a suitable mechanical linkage or brake cable to rotate the piston 114 to mechanically apply this self-energized brake.

It will be noted that the right and left cross drive units are basically the same and that both provide low and high drives and braking. The details may be constructed as shown in Patent No. 2,912,884, Christenson et al., except that the vehicle brake is modified for hydraulic actuation as described above.

*Hydraulic controls*

The hydraulic control system is supplied with fluid collected in the sump 121 which is conveniently located in the lower portion of the fixed housing 25 of the ratio unit 10 and/or the cross drive unit 11. The pump 122 takes fluid from the sump and supplies it to the main line 123 at a pressure regulated by the main line regulator valve 124. The exhaust from the main line regulator valve is connected by line 126 in the conventional manner to the converter and lubrication lines and returned to the sump. The fluid from all exhausts is also returned to the sump. Though the transmission and steering valves are preferably grouped in separate valve bodies, each valve may have a separate valve body or all the valves may be in one valve body 125.

The main line 123 is connected to the manual selector valve 128 which has a valve element 129 having lands a, b, c, d and e of equal diameter located in a bore 131 of a valve body 125. The valve element 129 is actuated by a linkage 132 between neutral N, high HI, intermediate INT, low LO, low low LO-LO, and reverse R positions and retained in each of these positions by a spring loaded ball detent 133 located in the valve body which engages an individual groove 134 in each of these positions. The valve element 129 has a bore extending through the valve element which is closed at both ends and has ports 137 connecting the bore 136 to the space between the lands d and e, ports 138 connecting the bore to the space between the lands c and d, and ports 139 connecting the bore to the space between the lands a and b. The main line port 123 is connected to the space between the lands d and e in all valve positions and thus supplies fluid to the bore 136 and to the space between the lands *a* and *b* and *c* and *d* at all times. The manual valve 128 in the neutral position shown supplies main line pressure from main line 123 to the neutral, intermediate, high or first signal line 141. Fluid supplied by the main line to the low exhaust branch line 142 is blocked at one-way check valve 143. The low brake line 144 is connected to exhaust 146. The high clutch line 147, the intermediate brake line 148, the low low or second signal line 149, and the reverse brake line 151 are connected at the end of the valve bore to exhaust 152.

When the valve element 129 is moved to the high position HI, main line fluid is supplied from line 123 through the bore 136 and the space between lands *a* and *b* to the high clutch line 147 and the other connections remain the same as in neutral, the first signal line 141 being supplied and the others being exhausted.

When the valve element 129 is moved to the intermediate position INT main line 123 is connected by bore 136 to intermediate brake line 148, the other connections remaining the same as in high position except that high clutch line 147 is connected to exhaust 146.

When the valve element 129 is moved to the low position LO, the main line 123 is connected between the lands *c* and *d* to the low brake line 144. Fluid is also supplied to line 142 to close check valve 143. The first signal line is connected to exhaust 153 and the high clutch line 147 and intermediate brake line 148 are connected to exhaust 146. Second signal line 149 and reverse line 151 are connected to exhaust 152.

When the valve element 129 is moved to the low low LO-LO position, main line remains directly connected to line 142 to close check valve 143 and connected by bore 136 between the lands *c* and *d* to low brake line 144 and is additionally connected between lands *a* and *b* to the second signal line 149. The other lines remain connected to exhaust as in low.

On moving the valve 129 to reverse position R main line 123 is only connected through bore 136 and between lands *a* and *b* to reverse brake line 151. The first signal line 141 and low exhaust line 142 are connected to exhaust 153 permitting exhaust of the low motor through check valve 143 since the low brake line 144 is blocked. The high clutch line 147, intermediate brake line 148 and second signal line are connected to exhaust 146.

The throttle valve 156 which may be formed as a part of a conventional throttle pressure or regulator valve supplies main line pressure from line 123 to throttle line 157, when the throttle pedal and the associated linkage 158 is between the zero or fully closed and one-quarter open throttle valve position. Valve 156 consists of a valve element 159 having lands *a* and *b* located in a valve bore 161. During movement of the throttle pedal linkage 158 from the zero position to the one-fourth open position, main line 123 is connected between lands *a* and *b* to line 157. During the remainder of the throttle movement from one-quarter position to full throttle this connection is closed. Though the valve generally provides sufficient leakage so that the line would not be blocked to maintain the pressure during movement from one-quarter to full throttle position of this valve, it may be desirable to provide an orifice exhaust 162 to insure reduction of the pressure in line 157 during the latter portion of valve movement.

The steer valve assembly 163 is located in the valve body 125 and consists of a right steer valve 164 and a left steer valve 166. The right steer valve 164 has a drive feed element 167 located in a bore 168 which normally connects branch 165 of main line 123 to the right drive feed line 169 which, as explained below, provides the fluid feed to partially establish through other control valves the drive in the cross drive transmission 11. On right steer the right steer valve 164 blocks branch 165 and connects right drive feed line to exhaust 179. The right steer valve element 171 located in the bore 172 normally blocks the branch 170 of main line 123 but on steering to the right connects the main line to the right steer feed line 173 for connection through other valves as explained below to effect steering. The left steer valve 166 similarly has a left drive feed element 176 reciprocally mounted in a bore 177 to normally connect the branch 165 of main line 123 to the left drive feed line 178 and during left steering to disconnect this line 178 and connect it to exhaust 179. The left steer valve element 181 located in the bore 182 normally blocks branch 170 of main line 123 but on left steering connects line 123 to the left steer feed line 183 for connection through other valves as explained below to effect steering.

The manually operated steering control rotates the shaft 187 and the lever 186 fixed to the shaft so that the pin 188 fixed to the lever 186 engages the annular recess 189 in the upper end of the right drive valve element 167 to reciprocate the valve with rotary movement of the lever 186. The lever 186 similarly has at the opposite side a pin 191 fixed to the lever and fitting in to the annular groove 192 in the upper end of the left drive valve element 176. Thus, on movement of the manually steering control for right steer the lever 186 will be rotated clockwise so that the pin 188 depresses the right drive valve element 167 and right steer valve element 171 and raises the left drive valve element 176 and steer valve element 181. Similarly when moved for left steer, the lever 186 rotates in the opposite or counterclockwise direction moving the left drive valve element 176 and left steer valve element 181 downwardly as viewed in FIG. 2*b* and at the same time moves the right drive valve element 167 and right steer valve element 171 upwardly.

Since the remaining details of the right steer valve 164 and the left steer valve 166 are the same, the following description and like reference numerals apply to each of these valves. Though the description is made with specific reference to the right steer valve 164, the left steer valve 166 has the same structure and function. The right drive valve element 167 and the steer valve element 171 are normally resiliently retained in the relative position illustrated by a main spring 193 which resiliently biases these valves in a separating direction as limited by the rod 194 which has suitable abutments such as a nut or head to prevent further relative separation of these valve elements. It is preferred that rod 194 be attached to steer valve element 171. A shorter auxiliary spring 196 fixed in the bore within valve element 167 to hold it in position after an initial degree of compression of the main spring engages the upper end of the valve element 171 to provide an additional spring force biasing these valve elements apart. Thus, the composite spring has an increasing load rate with displacement to transmit an increasing force with equal displacement to the steer valve element 171. The space in bore 168 between valve elements 167 and 171 and the bore within valve element 167 is connected by port 197 and space 198 to exhaust 201. The valve element 167 has an annular groove 202 normally connecting the port 203 of main line 123 to the port for the right drive feed line 169. When the valve element 167 is depressed during right steering this connection is closed and the groove 202 connects the port of right drive feed line 169 to exhaust port and line 179. The valve element has a bleed groove 204 which is a narrow axial groove extending beyond annular groove so that in the closed position of valve element 167 sufficient fluid is passed to make up leakage in the part of the system supplied by line 169 so that the anti-reverse steer valve 217 can provide overlap as explained below.

The steer valve element 171 has an uper groove 206 having ports 207 conecting the groove to a central bore 208 which is opened at the free end of valve element 171 to provide communication between groove 206 and the closed end of the bore 172. With the steer valve 171 in the normal position the steer valve element 171 as shown blocks the main line port 209. During right steer the right steer valve element 171 is moved down so that the groove 206 connects main line port 209 to the right steer feed line 173. Whenever fluid is supplied to the steer feed line 173 it is also supplied to the bore 208 in the closed end of valve bore 172 to provide an upward hydraulic biasing force proportional to clutch pressure on the valve element 171 to provide feel proportional to clutch pressure through the springs 193 and 196 since the rod 194 is slidably mounted particularly in the valve element 167. Since the composite spring provides increasing force with equal movement the operator may easily obtain, by constant control movement, an intitial low pressure which at first increases slowly and then increases rapidly to line pressure. The steer valve element is a regulating valve which regulates the pressure in accordance with the biasing force. After full engagement the valve element 167 may directly engage valve element 171 to stop regulation and provide full line pressure.

On left steer the pin 188 lifts right drive valve element 167 which, through rod 194, lifts right steer valve element 171 to connect main line 123 at branch 170 through groove 211 of right steer valve element 171 to the left lubrication feed line 174. Similarly on right steer the left steer valve is raised to connect main line branch 170 through groove 211 of the left steer valve element to the right lubrication feed line 184. The orifices 174' and 184' in lube lines 174 and 184 limit flow for lubrication so that line pressure can be supplied to steer feed lines 173 and 183 respecitvely.

The right lubrication feed line 184 is connected by an orifice check valve to the right steer feed line 173 to permit a limited amount of flow from the steer feed line 173 to the right lubrication feed line 184 and to prevent flow in the reverse direction to provide an exhaust for the steer feed line. The left steer feed line 183 is similarly connected by an orifice and a check valve 214 to the left lube feed line 174 to provide an exhaust.

Referring to FIG. 2a, the anti-reverse steer valve 216 controls the exhaust line 179 which provides exhaust for both the right and left-hand drive feed lines 169 and 178 in accordance with throttle pedal position as signaled by throttle line 157 and the pressure in the drive or brake being engaged as supplied by the right and left steer feed lines 179 and 183. Valve 216 is located in the body 125 and has a valve element 217 having small lands $a$ and $b$ and a large land $c$ at the lower end located in the stepped bore 219. A plug 221 is located in the large end of bore 219 and has stops 222 and 223 extending from each end to limit the movement of plug 221. The stop 223 also transmits force from the plug to the valve 217. The right steer feed line 173 via branch 173' is connected to the closed lower end of bore 219 between the plug 221 and the lower end in all positions of plug 221 and valve 217. The left steer feed line 183 has branch 183' connected to the bore 219 between the valve element 217 and the plug 221 in all positions of the valve and plug. The throttle line 157 which supplies main line pressure between zero and one-fourth throttle only is connected in all valve positions to the bore 218 between the small land $b$ and the large land $c$ to provide a force moving the valve to the closed position. The exhaust line 179 which provides exhaust for both the right and the left drive feed lines 169 and 178 is connected to the bore 218 between the lands $a$ and $b$ of equal diameter adjacent the land $b$ in all valve positions. This exhaust pressure does not act to move valve 217. With the valve in the normal position shown, exhaust line 179 is connected by bypass line 224 to exhaust 226 at the upper end above land $a$. When the valve element 217 is moved to the closed position land $a$ blocks bypass line 224 to exhaust 226 and thus closes exhaust line 179 to maintain pressure in the drive feed lines 169 and 178. The end spring 227 located between the end of bore 219 and plug 221 biases the plug 221 and element 217 to the closed position. The intermediate spring 228 located between the plug 221 and valve element 217 will also bias the valve element 217 to the closed position but is weaker than spring 228 so the plug normally assumes the upper position shown. When pressure is not being supplied to the steer feed lines 173 and 183 and thus their branches 173' and 183' are exhausted, the valve 217 is merely biased to the open position by the springs 227 and 228. Main line pressure, when supplied between zero and one-fourth throttle opening via line 177, will move valve element 217 to the closed position blocking exhaust line 179 to prevent reverse steering on coast. However, when fluid is supplied to either steer feed line, and the pressure reaches a sufficient value to engage a drive or brake to effect steering, the pressure supplied by line 173' acting through plug 221 or the pressure supplied by line 183' acting directly on valve element 217 will move the valve element 217 to the open position shown regardless of the presence or absence of the throttle pressure supplied by line 157 to insure that exhaust line 179 is connected to exhaust 226.

The steer relay valve 231, also located in body 125, has a right valve element 232 having lands $a$, $b$, $c$, $d$ and $e$ of equal diameter located in a bore 233 and a left valve element 234 having lands $a$, $b$, $c$, $d$ and $e$ of equal diameter located in a bore 236. The valve elements 232 and 234 though preferably made in two parts to simplify manufacture may be made in one piece since they move together in their aligned bores as a unit and are urged to the signal position shown when fluid pressure is supplied by the first signal line 141 in neutral, intermediate and high ratios to the closed chamber 237 at the lower end of bore 236. The spring 238 located in the upper end of bore 233 biases the valve element to the normal position where the line 141 is connected to exhaust. Exhaust 239 prevents accumulation of fluid in the spring chamber interfering with the operation of the valve. The central cavity 241 of the valve body 125 is also connected to exhaust 242. In the signal position shown, steer relay valve element 232 connects the right steer feed line 173 between the lands $d$ and $e$ to the right low brake line branch 243 which is connected between lands $a$ and $b$ to the right low brake line 244. The right vehicle brake apply line 246 is connected between lands $c$ and $d$ to the right brake lube line 247. The right lube feed line 184 is connected between the lands $b$ and $c$ to the transfer line 248.

Similarly in the signal position shown the left steer relay valve element 234 connects the left steer feed line 183 between the lands $d$ and $e$ to the left low brake line 249, the left vehicle brake apply line 251 between the lands $c$ and $d$ to the left vehicle brake lube line 252, and the left lube feed line 174 to the transfer line 253. The left low brake branch line 254 is ineffective in this valve position.

On exhaust of the first signal line 141 spring 238 moves the valve elements 232 and 234 to the normal position. In this position the right steer relay valve element 232 connects the right steer feed line 173 between the lands $c$ and $d$ to the right vehicle brake apply line 246, the right lube feed line 184 between the lands $b$ and $c$ to the right brake lube line 247 and the right low brake apply line 244 between lands $a$ and $b$ to right transfer line 248. The left steer relay valve element 234 in the normal or lower position connects the left transfer line 253 between lands $a$ and $b$ to the left low brake branch line 254 which is connected lands $d$ and $e$ to the left low brake supply line 249, the left lube feed line 174 between the lands $b$ and $c$ to the left vehicle brake lube line 252, and the left steer feed line 183 between the lands $c$ and $d$ to the left vehicle brake apply line 251.

The drive relay valve 261 also located in valve body 125 has a right valve element 262 having lands $a$, $b$ and $c$ of equal diameter located in a bore 263 and a left valve element 266 having lands $a$, $b$ and $c$ of equal diameter located in a bore 267. A spring 268 at the upper end of bore 263 acts on the valve element 262 to position both valve elements 262 and 266 in the normal position shown in FIG. 2a. When fluid is supplied by the second signal line 149 in low low range to the closed chamber 269 at the lower end of bore 267, the fluid pressure acts on the lower end of valve element 266 to move both valve elements up to the signal position. The valve elements 262 and 266 are made separately for ease of manufacture but may be made in one piece. The chamber for spring 268 is at all times connected to exhaust by exhaust 270 to prevent accumulation of fluid in the spring chamber interfering with the operation of the valve. With the drive relay valve 261 in the normal position shown, the right valve element 262 is located so that land $a$ blocks exhaust 271, the right drive feed line 169 is connected between the lands $a$ and $b$ to the right high clutch line 272, and the right transfer line 248 is connected between the lands $b$ and $c$ to the right low lubrication line 273. The left valve element 266 in the normal position shown connects the drive feed line 178 between the lands $a$ and $b$ to the left high clutch line 274 and the left transfer line 253 between lands $b$ and $c$ to the left low lubrication line 276.

When pressure is supplied by the manual valve to the second signal line 149 to the closed chamber 269, both valve elements 262 and 266 are moved to the upper position against the biasing force of spring 268. Then the valve element 262 connects the right high clutch line 272 to exhaust 271 between lands $a$ and $b$, the right drive feed line 169 between lands $d$ and $c$ to transfer line 248, and the right low lube line 273 to exhaust 242. The left valve element 266 connects the left high clutch line 274 between lands $a$ and $b$ to exhaust 277, the left drive feed line 178 between lands $b$ and $c$ to left transfer line 253, and the left low lube line 276 is blocked by land $c$.

*Operation*

In the neutral position illustrated in the drawing the input driven pump 122 supplies fluid regulated by the main pressure regulator valve 124 to the main line 123. The low brake line 144 is connected to exhaust 146, and intermediate brake line 148, high clutch line 147 and reverse line 151 are connected to exhaust 152 at the manual valve so that all the gear ratios in the ratio unit 10 are disengaged to provide a positive neutral. In order to condition the transmission for drive on the engagement of one of the gear drives the ratio unit 10 the torque converter is conditioned for drive in neutral position of the manual valve, since the exhaust line 126 of the main regulator valve 124 is connected in the usual manner to supply fluid to the torque converter 15. Main line pressure is also supplied by the manual valve 128 to the first signal line 141 to place the steer relay valve 231 in signal position as shown while the spring 268 holds the drive relay valve 261 in the normal position. Thus, with the steering control 186 in the straight ahead position as shown in FIG. 2b the steering valve unit or assembly 163 will connect main line 123 via branch 165 to both the right and left drive feed lines 169 and 178. The right drive feed line 169 is connected at drive valve 261 between lands $a$ and $b$ of valve element 262 to the right high clutch supply line 272 to actuate motor 84 and clutch 83 to engage direct drive of the right cross drive unit. The left drive feed line 178 is similarly connected by valve 261 between lands $a$ and $b$ of the valve element 266 to the left high clutch line 274 to actuate motor 102 to engage the left drive clutch 101 to effect direct drive in the left cross drive unit. Thus, the transmission is conditioned for drive.

When the vehicle is started with the steering valve in the position shown for straight forward drive in each of the reverse R, low LO, intermediate INT, and high HI ranges of operation, the drive relay valve 261 remains biased by spring 268 in the normal position connecting the right and left drive feed lines 169 and 178 to engage the right and left drive clutches 83 and 101 of the cross drive unit to provide direct drive in the cross drive unit as explained above. The shifting is accomplished entirely in the ratio unit 10 under the control of the manual valve 128. In high ratio HI the manual valve 128 connects main line 123 via high clutch apply line 147 to engage the high clutch 51 to provide direct drive in the ratio unit and direct drive in the cross drive unit for high ratio. Fluid is also supplied by manual valve 128 to the first signal line 141 to position the steer relay valve 231 in the signal position shown to provide geared steer as explained below. The manual valve connects all other lines to exhaust, low line 144 to exhaust 146, and intermediate line 148, low low signal line 149 and reverse line 151 to exhaust 152.

When the manual valve 128 is moved to the intermediate position INT, main line 123 is connected to supply fluid to intermediate line 148 to engage the intermediate brake 48 to establish intermediate ratio in the multiratio unit 10 and to the first signal line 141 to place steer relay valve 231 in signal position to establish direct drive and geared steer as in high. The low line 144 and high line 147 are connected to exhaust 146 and low low signal line 149 and reverse line 151 are connected to exhaust 152 by manual valve 128 to insure disengagement of all other ratios.

In the low position LO manual valve 128 connects main line 123 to the low line 144 to engage low brake 39. The first signal line is connected to exhaust 153 and the second signal line to exhaust 152 to position both the drive relay valve 261 and the steer relay valve 231 in the normal position to establish a normal direct drive in the cross drive unit and a clutch brake steer as explained in detail below. The high line 147, intermediate line 148 and reverse line 151 are also connected to exhaust to disengage these drives.

When the manual valve is moved to the low low position LO-LO suitable for starting on step inclines or under extremely heavy loads, the manual valve 128 connects main line 123 to the low brake line 144 to engage the low brake 39 and to the low low or second signal line 149 which moves the drive relay valve 261 to the signal position. The steer valve assembly 163 in the forward position supplies fluid to both the right and left-hand drive feed lines 169 and 178. The right drive feed line 169 with valve element 262 in the signal position is connected between lands $b$ and $c$ to transfer line 248. The transfer line 248 with the right steer relay valve element 232 in the normal position is connected between lands $a$ and $b$ to the right low brake line 244 to engage the right low brake motor 87 and brake 86. The left drive feed line 178 with valve element 266 in the signal position is connected between lands $b$ and $c$ to left transfer line 253. This transfer line with valve element 234 of the steer relay valve 231 in the normal position is connected between the lands $a$ and $b$ to the low brake branch line 254 and between lands $d$ and $e$ to the low brake line 249 to actuate a low brake motor 104 to engage the left low brake 103 of the cross drive unit. Thus, in low low ratio, low ratio of the multiratio unit 10 and low ratio of the cross drive unit 11 are engaged to provide the lowest drive ratio. In low low ratio with the drive valve 261 in the signal position and the steer relay valve 231 in the normal position clutch brake steer is provided as explained below.

When the manual valve is moved to the reverse position, main line 123 is connected only to reverse line 151 to engage the reverse brake 67 of the multiratio unit 10. All other lines supplied by the manual valve are connected to exhaust to disengage all drives. The low line 144 is connected to exhaust 153 through check valve 143 and line 142. The high line 147 and intermediate line 148 are connected to exhaust 146 to disengage all other drives. The first signal line 141 and second signal line 149 are connected respectively to exhaust 153 and exhaust 146. In straight forward drive the right and left drive feed lines 169 and 178 are connected through the drive relay valve 261 to the right and left high clutch lines 169 and 274 to engage the right and left high clutch as explained above in high ratio to engage direct drive in the cross drive unit 11. Since the steer relay valve 231 is in the normal position, clutch brake steering is provided as explained below.

*Steering operation*

In the following description of the steering operation the functioning of the control system will be described in detail with regard to right steering and the similar operation for left steering will only be briefly outlined because the operation is basically the same. In both high and intermediate ratios where either high or intermediate ratio respectively is established in multiratio gear unit 10 and direct drive or high ratio normally established in the cross drive unit 11 for straight forward drive as explained above, geared steering is provided by downshifting either the right or left drive unit of cross drive unit 11 to the low ratio drive. Thus, the right and left tracks of the vehicle will be driven at a constant proportional speed determined by the cross drive gearing when the low brake is fully engaged. Intermediate steering radii may be obtained by partial engagement of the low brake. When the manual control is moved for right steering the lever 186 of the steering valve assembly 163, FIG. 2b, is moved clockwise to positively depress drive feed valve element 167 to disconnect the main line 123 from the right drive feed line 169 and to connect this line to exhaust 179. At the same time the spring 193 initially transmits and then springs 193 and 196 transmit a force to the right steer valve element 171 to connect main line 123 at port 209 to the right steer feed line 173. The small amount of leakage through orifice 212 does not substantially affect the supply of pressure by line 173. Since in intermediate and high ratios the steer relay valve 231 is in the signal position shown the right steer line 173 is connected between lands d and e of valve element 232 to line 243 and between lands a and b of valve element 232 to the right low brake supply line 244 to apply the right low brake 86 to place the right gear unit of cross drive 11 in forward ratio. This provides right steer.

The right steer valve 164 in the normal position connects main line 123 to drive feed line 169. The right steer feed line 173 is not exhausted at valve 164 but is exhausted by the orifice check valve exhaust 212 which permits drainage of fluid from line 173 to the right low lubrication line 184 which is always connected to exhaust at the brake. The pressure supplied by line 173 to the low clutch motor 87 to engage the low brake 86 also fills the bore 268 in valve element 271 and the connected closed end portion of bore 172 to provide a fluid pressure acting on the valve element 171 upwardly opposing the springs 193 and 196 to provide a feel force so that the operator can determine the extent of pressure being supplied to the low brake motor 87 and thus feel the degree of the pressure and brake application. Initial movement of the steering control while acting through main spring 193 provides a slow increase in pressure compared to control movement until the clutch or brake is initially engaged and then action through both springs provides a large increase in pressure compared to control movement. The connection to the left lube feed line 174 remains blocked during right steering.

However, during right steering the clockwise movement of lever 186 through pin 191 and groove 192 raises the left drive valve element 176 and through rod 194 the left steer valve element 181 connecting main line 123 at branch 170 through groove 211 of valve element 181 to the right lube feed line 184. The line 184 is connected through the steer relay valve 231 by the right steer relay valve element 232 in the signal position shown to transfer line 248. The transfer line is connected by the right element 262 of drive relay valve 261 in the position shown between lands b and c to the right low lubrication line 273 which lubricates the plates of the right low brake 86.

If the accelerator is in a low position, for example, between zero and one-fourth throttle opening, pressure in line 157 will move the valve element 217 down to block exhaust line 179 to delay the release of the right high clutch 83 until there is sufficient pressure in the right low brake motor 87 to apply the brake 86. Since mere delay of the exhaust from motor 87 is generally not sufficient to hold brake 86 engaged due to leakage in the system, valve element 167 has a bleed or narrow axial groove 204 extending from the annular groove 202 so that in the closed position valve 167 still permits enough flow from line 123 to line 169 to make up any leakage but insufficient to engage brake 86 when the exhaust is open. A branch 173' of line 173 is connected to the anti-reverse steer valve to act on plug 221 to move the valve to open position connecting exhaust line 179 to exhaust 226 only when there is sufficient pressure in the steer feed line 173 to engage low brake 86. This prevents reverse steering due to coasting which could occur during the period between disengagement of the high clutch 83 and engagement of the low clutch 86. Overlap between these clutches is provided by the anti-reverse steer valve 216 to prevent reverse steering under these low throttle conditions where coasting would occur. There is no overlap at high throttle where it is not desired.

For left steering, the lever 186 is moved in a counter-clockwise direction and similarly cuts off the supply of main line fluid from line 123 to the left drive feed line 178 and connects this line to exhaust line 179. At the same time with the same feel arrangement fluid is supplied under an increasing pressure with increasing valve movement to the steer feed line 183 which is connected by the steer relay valve 231 to the left low brake supply line 249 to apply the left low brake 103. The right steer valve 164 is similarly raised so that the right steer valve element 171 connects main line 123 to the left lube feed line 174 which is connected by valve element 234 of the steer relay valve 231, transfer line 253 and valve element 266 of the drive relay valve 261 to the left low lubrication line 276 to lubricate the left brake 103. The anti-reverse steer valve 216 will similarly prevent reverse steering at low throttle positions and this action is terminated when pressure rises in the motor 104 actuating the low brake 103 which is transmitted by branch 183' of line 183 to act on the valve element 217 to move it to the exhaust position.

When the manual valve is placed in the low or reverse ratio positions to place the multiratio unit 10 in either low ratio or reverse ratio, the cross drive unit 11 is placed in direct or high ratio for straight forward drive as explained above. The drive relay valve 261 and the steer relay valve 231 are both in the normal position since both the first and second signal lines 141 and 149 are vented at the manual valve to provide clutch brake steer. Prior to a right turn the main line 123 is conected by the right drive valve element 167 to the right drive feed line 169 which is connected via the drive relay valve 261 to the right high clutch line 272 to engage the right high or direct drive clutch 83. The left clutch is similarly engaged. On right steer clockwise movement of the lever 186 depresses drive valve element 167 to first cut off supply from the main line 123 to the right drive feed line 169 and the right clutch motor 84 and then to connect this clutch motor and line 169 to the exhaust line 179 to disengage the high clutch 83. At the same time the spring 193 and with continued movement the spring 196 move the steer valve element 171 down to connect main line 123 to the right steer feed line 173. The pressure increase in the line 173 may be controlled by the operator as in all other steering by the degree of force applied to the manual steering control tending to move the valve unit 164 down. The right steer feed line 173 is connected at the steer relay valve 231 between the lands c and d of the right valve element 232 to the right vehicle brake apply line 246 to actuate the right vehicle brake motor 91 to engage the vehicle brake 88 to retard the right output shaft 82 to effect right steering. This will provide right clutch brake steer in forward and reverse. During downward movement of the right steer valve element 171 fluid is not supplied to the left lube line 174.

During right steering the left steer valve is moved upwardly. Both the feed valve element 176 and the left steer valve element 181 move upwardly. The drive valve element 176 during this movement merely maintains a connection between main line 123 and the left drive feed line 178. However, the left steer valve element 181 connects the main line 123 through groove 211 in element 181 to the right lubrication feed line 184 which is connected between lands b and c of valve element 232 of the steer relay valve 231 in the normal position to the right vehicle brake lube line 247 which lubricates the plates of vehicle brake 88.

The anti-reverse steer valve 216 functions during steering in low and reverse drive ranges to provide overlap to prevent reverse steering in the same way that it performs during the geared steer operation described above in high and intermediate ratios. When the steer valve assembly 163 is operated in low and reverse ratios to provide clutch brake steering between the high clutch 83 and the brake 88, the anti-reverse steer valve unit 216 blocks the high clutch exhaust by closing exhaust line 179 to provide overlap. The exhaust 179 is blocked by the valve 216 when positioned by throttle pressure supplied via line 157 whenever the throttle is in any position between zero and one-quarter open throttle. While the exhaust is blocked bleed 204 provides sufficient flow to make up leakage to hold the high clutch engaged. When the pressure supplied to the vehicle brake 88 builds up sufficiently to engage the brake, the pressure in line 173 and branch 173' supplies fluid to act on the valve element 217 and anti-reverse valve 216 to open the valve to permit exhaust from line 179 and thus release the high clutch 83.

In low and reverse ratios left steering functions in substantially the same manner. The left steer valve 163 is moved down so that the drive valve 176 cuts off the supply of fluid to the drive feed line 178 and through the drive relay valve 261 to the left high clutch 101. At the same time in accordance with increasing pressure on the steer control an increasing fluid pressure is supplied to the left steer feed line 183. This pressure is connected through the steer relay valve 231 between lands c and d and valve element 234 in the normal position to the left vehicle brake apply line 251 to apply the left vehicle brake 112. Since on left steer the right steer valve and particularly element 171 is raised, fluid is supplied from the main line 123 to the left lubrication line 174 which is connected by valve element 234 in the normal position to the left vehicle brake lubrication line 252 to lubricate the plates of brake 112.

When the manual valve 128 is placed in the LO-LO ratio, low ratio is engaged in the multiratio unit 10 and low ratio is engaged in the cross drive unit 11 for normal forward drive as explained above. During right steering downward movement of the right steer valve unit 164 through the action of the valve element 167 terminates the supply of fluid from the main line 123 to the right drive feed line 169. The right drive feed line is normally connected in low low through the right drive relay valve 262 in the signal position via transfer line 248 to the right steer relay valve element 232 which in the normal position connects this supply to the right low brake line 244 to supply right low brake 86. Downward movement of the valve element 167 blocks this supply to brake 86 and connects the right low brake motor 87 through line 169 to the exhaust line 179 to disengage the low brake. At the same time the right steer valve element 171 is moved down to connect main line 123 to the right steer feed line 173. During all steering operation the pressure developed in the right steer feed line 173 acts upwardly on valve element 171 to provide feel resistance so that the pressure supplied by the operator to move the manual steering control reflects the pressure being applied in the control system. The right steer feed line 173 is connected at the steer relay valve 231 between the lands c and d of the right valve element 232 in its normal position to the right vehicle brake apply line 246 which actuates the motor 92 to engage the right vehicle brake 88. During right steering the left steer valve 166 is moved upwardly so that the steer valve element 181 connects main line 123 via groove 211 to the right lubrication feed line 184. This line is also connected by the right valve element 232 of the steer relay valve 231 when in the normal position between the lands b and c to the right vehicle brake lube line 247 to supply lubrication to the plates of brake 88.

During this phase of operation the anti-reverse steer valve 216 functions in the same manner previously described to prevent disengagement of the low brake 86 before engagement of the vehicle brake 88 when the vehicle is being operated between zero and one-fourth opened throttle pedal positions. This is done in the same way by blocking the exhaust line 179 which provides the exhaust in low low for the low brake 86. As soon as pressure develops in the motor 91 to apply brake 88, there is a pressure increase in line 173 which supplies this motor. This pressure acting through branch 173' acts on the plug 221 to move the valve element 217 to the open position regardless of the presence of throttle pressure supplied by line 157. This opens exhaust 179 to disengage the drive only when the brakes are engaged to prevent reverse steering.

The vehicle brakes 88 and 112 may be applied by a linkage as shown in Patent 2,912,884 connected to ears 95 and 118 to rotate annular pistons 92 and 114 to mechanically apply the brakes which are self-energized by balls and cams 94 and 117. When the brakes are applied the pump 281 driven by cross shaft 73 pumps cooling fluid via lines 282 and 283 to cool brakes 88 and 112. The intake 284 of pump 281 is preferably connected to sump 121 through a check valve and has an air vent valve closed by the brake linkage in the brake apply position as shown in Patent 2,912,884 so that pump only pumps when the brake is applied.

The chamber within the brake 88 and motor 91 may be sealed during brake application when piston 92 engages the plates of brake 88 and housing wall 286 is sealed to the shaft 73 and disc member 89 has a support disc portion 287 also sealed to the shaft 73. Then after initial engagement of the brake 88 pressure would be confined in this chamber and flow via right brake lube line 247, right steer relay valve 232 in signal position to right vehicle brake apply line 246 to provide a pressure to hydraulically assist the brake application. This assist would only occur in neutral, intermediate and high.

The left brake 112 may be similarly provided with a chamber by sealing housing wall 291 to shaft 73 and providing disc 111 with a support disc 292. Then coolant fluid supplied by line 283 would flow through line 252 and return via line 251 to hydraulically assist the brake application.

Modification

Since the transmission 10 shown in FIG. 3d is the same as the transmission 10, FIG. 2, and the cross drive 11, FIG. 3a, is the same as the cross drive 11, FIG. 2b, reference is made to the above description.

Modification—Hydraulic controls—Source and pressure regulator valve

The hydraulic control system is supplied with fluid collected in the sump 321 (FIG. 3c) which is conveniently located in the lower portion of the fixed housing 25 of the ratio unit 10 and/or the cross drive unit 11. The pump 322 takes fluid from the sump and supplies it to the main line 323. The pressure in the main line is regulated by regulator valve 324 which has a primary exhaust connected to line 326 to supply the converter and lubrication lines before being returned to the sump. The regulator valve has a secondary exhaust which like all other exhausts in the control system is connected to directly return the fluid to the sump. The valves for controlling both the ratio unit 10 and the cross drive unit 11 are preferably arranged in a group in one valve body 325 located between these two transmission units. The individual right and left steer drive relay valves and the steering valves have substantially the same length and thus may be easily assembled in a unitary body member. However, the steering valves and the ratio control valves may be separated and placed as desired.

The main line 323 is connected to the main pressure regulator valve 324 which regulates the main line pressure in line 323. The primary exhaust from this regulator valve is connected to supply the converter supply line 326 to supply the torque converter operating chamber and the lubrication lines. The secondary exhaust 509 is connected directly to the sump. The main line pressure is also reduced in neutral, high and intermediate ratios and whenever the transmission is operating under speed and throttle conditions of a predetermined character normally providing engagement of the lockup clutch.

The main line pressure regulator valve 324 has a valve element 501 having a small land $a$ located in a small bore portion 502 and a large land $b$ located in a large bore portion 503. The main line 323 is connected to port 504 located between the small bore 502 and the large bore 503 and connecting at all times the main line to the space between the lands $a$ and $b$ so that the fluid pressure acts on the unbalanced area of land $b$ urging the valve element in the opening direction against the biasing force of spring 506. Movement in the opening or exhausting direction of valve element 501 first exhausts main line 323 to the converter and lubrication supply line 326 and then on further movement connects port 504 through aperture 507, bore 508 and spring chamber to exhaust 509. A control plug 511 located in the closed end of bore 502 has a stem 512 which limits movement of the valve 501 in the closing direction in the fully closed position shown. The lockup feed line 514 which supplies fluid whenever the lockup shift valve upshifts to permit engagement of the lockup clutch is connected to the closed end of bore 502 to act on plug 501 to assist the hydraulic forces acting on valve 501 to reduce the main line pressure. The first signal line 341 which supplies pressure in neutral, intermediate and high positions of the selector valve is connected to the port 516 located between the plug 511 and the upper end of valve 501 to reduce main line pressure in these ratios, and to disable the effect of the plug 511 to reduce main line pressure on the upshift of the lockup shift valve. An orifice 517 located in the lockup feed line 514 and an orifice 518 located in the first signal line both adjacent the main pressure regulator valve delay the action of these pressures on the main pressure regulator valve to prevent objectionable surges of main line pressure variation.

*Lockup shift valve*

The main line 323 is connected (FIG. 3d) through the lockup cut-off valve 521 to the lockup shift valve 522 which controls the engagement of the lockup clutch 27 in accordance with transmission or vehicle speed and torque demand as signalled by the throttle pedal position. The lockup shift valve 522 has a valve element 524 having a small land $a$ and a large land $b$ located in a stepped bore 526. A pitot governor 527 mounted on the hub 52 and rotating with shaft 21 supplies fluid under pressure to the governor line 528 which is connected to port 529 at the closed end of bore 526. The governor pressure acts on valve element 524 to move it in the upshift direction against the opposing biasing force of spring 531. The spring 531 is seated in a piston abutment 532 which is slidably mounted in the cylinder 533. The throttle control or pedal 534 is connected in the usual manner to control the supply of fuel to the engine driving the transmission and is connected by a suitable linkage 535 having lost motion as indicated by the spacing between the terminal portion 536 of linkage 535 and a stem 537 of the piston 532. When the throttle pedal 534 is moved from the closed throttle position shown in FIG. 3d as indicated by the arrow toward full throttle position, the first one-quarter movement of throttle advance merely takes up the lost motion between the terminal portion 536 of the linkage and does not move the stem 537 to increase the biasing force of spring 531. Further throttle pedal movement from the one-quarter open position to the full open position proportionately increases the biasing force of spring 531 with increasing throttle pedal position for increased fuel supply. In the downshift position shown, main line 323 is blocked by the land $b$ and the lockup feed line 538 is connected between the lands $a$ and $b$ to exhaust 539. On an increase in governor pressure, due to an increase in transmission speed sufficient to overcome the throttle modulated biasing force of spring 531, the valve element 524 upshifts to block exhaust 539 and connect main line 323 to supply fluid to the lockup feed line 538. In this upshift position the fluid under pressure acts on the unbalanced area between the lands $a$ and $b$ to hold the valve in the upshift position to assist the governor pressure so that a downshift will only occur at a lower speed to prevent hunting. The spring chamber and cylinder 533 are vented by line 541 to exhaust 542 to prevent accumulation of fluid in this chamber interfering with the operation of the valve.

*Lockup cut-off valve*

The lockup cut-off valve 521 (FIG. 3d) functions each time there is a change in ratio of the multiratio unit 10 under the control of the manual valve or selector valve 328 to disengage the lockup clutch for the duration of the shift and to reduce the converter pressure. The lockup cut-off valve 521 has a valve element 546 having lands $a$ and $b$ of equal diameter and a large land $c$. Lands $a$ and $b$ are spaced from each other to provide an intermediate port and are located in a small bore 547. The land $c$ has a larger diameter and is located contiguous to the small land $b$ and a large bore portion 548. The main line 323 is continuously connected through the lockup cut-off valve 521 by the annular port 549 which extends around the valve element 546. The port 549 is also connected by the orifice 551 to the ratio feed line 552 which supplies fluid at main line regulated pressure, as modified by the restriction of orifice 551, to the selector valve 328. The line 552 is also connected to the closed end of bore 548 to act on the land $c$ to normally urge and hold the valve in the normal downshift position shown in FIG. 3d. The lockup feed line 538 is at all times connected by the annular port 553 to the lockup feed line branch 514 and with the valve 546 in the downshift position shown is also connected between the lands $a$ and $b$ to the lockup clutch line 554. The space between the lands $b$ and $c$ and the small bore 547 and large bore 548 is connected by line 556 to exhaust 542 to prevent the accumulation of fluid at this point interfering with the operation of the valve. Whenever a ratio is being engaged in this transmission, fluid is supplied to a ratio motor by the selector valve 328. This fluid supply must pass from the main line 323 through the orifice 551 to the ratio feed line 552. The flow of fluid across the orifice 551 causes a reduction of pressure in line 552 and its branch 557 permitting the main line pressure in port 549 to act on land $a$ to upshift the valve 546 to disconnect lockup supply line 538 from the lockup clutch line 554 and to connect the lockup clutch line to the exhaust line 556 to exhaust and disengage the lockup clutch. When engagement of the ratio is completed, the flow stops and the pressure in lines 323 and 552 equalizes permitting valve 546 to return to the downshift position. The valve returns since the pressure acting on the larger area of land *c* provides a larger force to overcome the same pressure acting on the small land *a*. When fluid under pressure is supplied by the lockup clutch line 554 to the cylinder 30 to act on the inner face of piston 31, the lockup clutch 27 is engaged. On the exhaust of this fluid the fluid under pressure in the converter chamber acts on the opposite face of piston 31 to disengage the lockup clutch.

Converter pressure regulator valve

The converter supply line or primary exhaust of the main pressure regulator valve 324, FIG. 3c, is connected by a branch 561 to the converter pressure regulator valve 562, FIG. 3d, to regulate the pressure at a predetermined pressure lower than line pressure and preferably in embodiment 80 pounds. This valve is also controlled by the lockup clutch pressure to further reduce the pressure supplied to the converter to a lower value or preferably substantially to zero but maintaining the converter filled whenever the lockup clutch is engaged. The converter pressure regulator valve 562 has a valve element 563 having a small land *a* located in a small bore 564 and a large land *b* located in a large bore 565. The converter line branch 561 is connected to the closed end of bore 564 and acts on the outer end of land *a* to urge valve element 563 downwardly or in the opening direction against the biasing force of spring 567 located in a spring chamber 568 which is exhausted by exhaust 569 to prevent the accumulation of fluid in the spring chamber interfering with the operation of the valve. The valve is shown in the closed position. If converter inlet pressure in line 326 increases above the regulated value, fluid will flow through branch 561 moving valve 563 to the open position to exhaust fluid directly to the converter outlet line 571. The fluid supplied by lockup clutch line 554 to engage the lockup clutch also acts on the unbalanced area between lands *a* and *b* of valve element 563 to urge this valve element in the opening direction so that the pressure in converter supply line 326 is regulated at a lower value. The converter outlet line 571 is connected through a cooler 572 which has arranged in parallel or bypassing relationship a cooler bypass valve 573 arranged to bypass the cooler whenever the pressure in line 571 increases above 80 pounds. Line 571 also has a filter 574 and a similar filter bypass valve 576 permitting fluid to bypass the filter in the event the filter causes an excessive pressure drop. The line 571 is connected to a lubrication and pitot governor feed line 578 at a lower pressure regulated by the lubrication pressure regulator valve 579, the excess fluid being exhausted by line 581 to sump.

Selector valve

The main line 323 supplies fluid through the ratio feed line 552 to the manual selector valve 328, FIG. 3c, to supply main line fluid to each of the ratio engaging devices of the three-speed and reverse gear unit 32. The selector valve has valve element 329 having lands *a*, *b*, *c*, *d*, and *e* of equal diameter located in a bore 331 of a valve body 325. The valve element 329 is actuated by a suitable linkage not shown to position the valve element in neutral N, high HI, intermediate INT, low LO, low low LO–LO, and reverse R positions and retained in each of these positions by a spring loaded ball detent 333 located in the valve body which engages one of the individual grooves 334 in each of these positions. The valve element 329 has a bore 336 extending through the valve element which is closed at both ends and has port 337 connecting the bore 336 to the space between the lands *d* and *e*, ports 338 connecting the bore to the space between the lands *c* and *d*, and ports 339 connecting the bore to the space between the lands *a* and *b*. The ratio feed line 552 is connected to a port which is connected to the space between the lands *d* and *e* in all valve positions and thus supplies fluid to the bore 336 and to the space between the lands *a* and *b* and *c* and *d* at all times. The manual valve 328 in the neutral position shown supplies main line pressure from ratio feed line 552 to the neutral, intermediate and high or first signal line 341. Fluid supplied by the feed line to the low exhaust branch line 342 is blocked at one-way check valve 343. The low brake line 344 is connected to exhaust 346. The high clutch line 347, the intermediate brake line 348, the low low or second signal line 349 and the reverse brake line 351 are connected at the end of the valve bore to exhaust 352.

When the valve element 329 is moved to the high position HI, main line fluid is supplied by ratio feed line 552 through the bore 336 and the space between lands *a* and *b* to the high clutch line 347. The other connections remain the same as in neutral, the first signal line 341 being supplied with fluid under pressure and the other lines being exhausted.

When the valve element 329 is moved to the intermediate position INT, main line pressure supplied by line 552 is connected by bore 336 to intermediate brake line 348, the other connections remaining the same as in high position except that high clutch line 347 is connected to exhaust 346.

When the valve element 329 is moved to the low position LO, the main line pressure supplied by ratio feed line 552 is connected between the lands *c* and *d* to the low brake line 344. Fluid is also supplied to line 342 to close check valve 343. The first signal line is connected to exhaust 353 and the high clutch line 347 and intermediate brake line 348 are connected to exhaust 346. second signal line 349 and reverse line 351 are connected to exhaust 352.

When the valve element 329 is moved to the low low LO–LO position, main line pressure supplied by ratio feed line 552 remains directly connected to line 342 to close check valve 343 and connected by bore 336 between the lands *c* and *d* to low brake line 344 and is connected between lands *a* and *b* to the second signal line 349. The other lines remain connected to exhaust as in low.

On moving the valve 329 to reverse position R main line pressure supplied by ratio feed line 552 is connected through bore 336 and between lands *a* and *b* only to reverse brake line 351. The first signal line 341 and low exhaust line 342 are connected to exhaust 353 permitting exhaust of the low motor through check valve 343 since the low brake line 344 is blocked. The high clutch line 347, intermediate brake line 348 and second signal line are connected to exhaust 346.

Steer valve assembly

The steer valve assembly 363, FIG. 3b, is located in the valve body 325 and consists of a right steer valve 364 and a left steer valve 366. The right steer valve 364 has a drive feed element 367 located in a bore 368 which normally connects branch 365 of main line 323 to the right drive feed line 369 which, as explained below, provides the fluid feed to partially establish through other control or relay valves the drive in the cross drive transmission 11. On right steer the right steer valve 364 blocks branch 365 and connects right drive feed line to exhaust 379. The right steer valve element 371 located in the bore 372 normally blocks the branch 370 of main line 323 but on steering to the right connects the main line to the right steer feed line 373 for connection through other valves as explained below to effect steering. The left steer valve 366 similarly has a left drive feed element 376 reciprocally mounted in a bore 377 to normally connect the branch 365 of main line 323 to the left drive feed line 378 and during left steering to disconnect this line 378 and connect it to exhaust 379. The left steer valve element 381 located in the bore 382 normally blocks branch 370 of main line 323 but on left steering connects line 323 to the left steer feed line 383 for connection through other valves as explained below to effect steering.

The manually operated steering control rotates the shaft 387 and the lever 386 fixed to the shaft so that the pin 388 fixed to the lever 386 engages the annular recess 389 in the upper end of the right drive valve element 367 to reciprocate the valve with rotary movement of the lever 386. The lever 386 similarly has at the opposite side a pin 391 fixed to the lever and fitting into the annular recess 392 in the upper end of the left drive valve element 376. Thus, on movement of the manual steering control for right steer the lever 386 will be rotated clockwise so that the pin 388 depresses the right drive valve element 367 and right steer valve element 371 and raises the left drive valve element 376 and steer valve element 381. Similarly when moved for left steer, the lever 386 rotates in the opposite or counterclockwise direction moving the left drive valve element 376 and left steer valve element 381 downwardly as viewed in FIG. 3b and at the same time moves the right drive valve element 367 and right steer valve element 371 upwardly.

Since the remaining details of the right steer valve 364 and the left steer valve 366 are the same, the following description and like reference numerals apply to each of these valves. Though the description is made with specific reference to the right steer valve 364, the left steer valve 366 has the same structure and function. The right drive valve element 367 and the steer valve element 371 are normally resiliently retained in the relative position illustrated by a main spring 393 which resiliently biases these valves in a separating direction as limited by the rod 394 which has suitable abutments such as a nut or head to prevent further relative separation of these valve elements. It is preferred that rod 394 be attached to steer valve element 371. A shorter auxiliary spring 396 is located between valve element 367 and valve element 371 around rod 394 and within spring 393. The auxiliary spring is initially ineffective but after an initial degree of compression of the main spring is engaged between the valve elements to provide an additional spring force biasing these valve elements apart. Thus, the composite spring has an increasing load rate with displacement to transmit an increasing force with equal displacement to the steer valve element 371. The space in bore 368 between valve elements 367 and 371 and the bore within valve element 367 is connected by port 397 and space 398 to exhaust 401. The valve element 367 has an annular groove 402 normally connecting the port 403 of main line 323 to the port for the right drive feed line 369. When the valve element 367 is depressed during right steering this connection is closed and the groove 402 connects the port of right drive feed line 369 to exhaust port and line 379. The valve element has an axial bleed groove 404 which is a narrow axial groove extending beyond annular groove so that in the closed position of the valve element 367 sufficient fluid is passed to make up leakage in the part of the system supplied by line 369 so that the anti-reverse steer valve 416 can provide overlap as explained below.

The steer valve element 371 has a groove 406 having ports 407 connecting the groove to a central bore 408 which is opened at the free end of valve element 371 to provide communication between groove 406 and the closed end of the bore 372. With the steer valve 371 in the normal position the steer valve element 371 as shown blocks the main line port 409. During right steer the right steer valve element 371 is moved down so that the groove 406 connects main line port 409 to the right steer feed line 373. Whenever fluid is supplied to the steer feed line 373 it is also supplied to the bore 408 and the closed end of valve bore 372 to provide an upward hydraulic biasing force proportional to clutch pressure on the valve element 371 to provide feel proportional to clutch pressure through the springs 393 and 396. Since the composite spring provides increasing force with equal movement, the operator may easily obtain, by constant control movement, an initial low pressure which at first increases slowly and then increases rapidly to line pressure. The steer valve element is a regulating valve which regulates the pressure in accordance with the spring biasing force. After full engagement the valve element 367 may directly engage valve element 371 to stop regulation and provide full line pressure.

The lower end of the steer valve 371 has an edge 410 cooperating with the port 411 to regulate the pressure of the fluid supplied from the main line during steering to the right lubrication feed line 384. The lower edge of groove 406 and edge 410 are substantially the same distance apart as the upper edge of port 409 and the lower edge of port 411 so that the valve 378 will in the regulating position regulate the pressure of the fluid supplied from the main line to the steer feed line 373 to provide an increasing pressure delivered to the steer feed line with increasing spring force on valve element 371 and a decreasing pressure supplied to the lubrication feed line 384 with increasing spring force. As pointed out above the groove 406 and port 409 cooperate to regulate the pressure from the fluid supplied to the steer feed line 373 in accordance with the position of the manual control lever 386 which controls the spring biasing force supplied to the valve 371. During this regulating action if the pressure in the steer feed line 373 is substantially below that pressure called for by the operator's positioning of lever 386, groove 406 and port 409 will open wide to permit a high flow to rapidly build up the pressure in line 373 and at the same time substantially close edge 410 and port 411 to substantially reduce the flow of fluid to the lubrication feed line 384. The steer feed regulating port 409 and the lubrication feed regulating port 411 are arranged so that when the steer feed port is regulating in the normal manner to supply a normal quantity of fluid to the steer feed line the lubrication feed port 411 will supply a sufficient volume of fluid to the lubrication feed line 384 to lubricate the friction devices. To prevent complete cut-off of the lubricant feed to lubrication feed line 384 particularly when the steer feed line 373 requires the high flow rate, the orifice bypass line 412 connects the steer feed line 373 to the lubrication feed line 384 to always insure the minimum requirement for lubrication and cooling of the friction devices. When the steer valve 371 is returned to the straight drive position shown, the steer feed line 373 is connected to port 407 and bore 408 and bore 372 to the lubrication feed line 384 which in effect connects steer feed line 373 to exhaust. Orifice 412 also connects line 373 to exhaust.

The left steer feed valve 381 is constructed in the same manner as the right steer feed valve 371 and similarly regulates the pressure supplied by the main line branch 370 to the left steer feed line 383 and the left lubrication feed line 374.

*Anti-reverse steer valve*

The anti-reverse steer valve 416, FIG. 3b, controls the exhaust from exhaust line 379 which provides the exhaust for both the right and left drive feed lines 369 and 378 in accordance with engine manifold vacuum. The anti-reverse steer valve 416 consists of a valve element 417 having a small land *a* located in a small bore 418 and a large land *b* located in a large bore portion 419. The valve element 417 is connected to a diaphragm 421 secured in a housing 422 to provide a vacuum chamber 423 connected by port 424 to the engine manifold of the internal combustion engine driving the transmission to supply engine manifold vacuum to the chamber 423. The spring 425 normally biases the valve element 417 to the open position shown, wherein the exhaust line 379 is connected by port 426 to exhaust 427. The exhaust 427 also insures that the fluid side of the diaphragm 421 is at atmospheric pressure. At high engine manifold vacuum, indicating that the engine is not idling, the reduction of pressure in chamber 423 permits atmospheric pressure communicating through exhaust 427 to move diaphragm 421 to compress spring 425 and move valve element 417 to the closed position blocking port 426 to block exhaust line 379 and prevent the release of the drive engaged by the drive feed line 369 and 378. When pressure in either steer feed line 373 or 383 rises sufficiently to indicate partial engagement of the steer drive being engaged, the pressure in these lines is connected by shuttle valve 428 and the line 429 to port 429' to act on the unbalanced area of land $b$ to move valve element 417 to the open position permitting exhaust from line 379. The shuttle valve 428 is a small cylindrical plug located in a bore and operable to be moved in either direction by the pressure in either right steer feed line 373 or left steer feed line 383. Since pressure during steering is only supplied alternatively to right steer feed line 373 and left steer feed line 383, the shuttle valve 428 will shift to connect either of these lines to the line 429 when pressure is being supplied to the line and to block exhaust of this pressure to the other line.

Steer relay valves

The right steer relay valve 430, FIG. 3b, and the left steer relay valve 431, FIG. 3a, control the supply of the steer feed fluid via lines 373 and 383 respectively, and lubrication feed lines 384 and 374 respectively to the ratio engaging devices and vehicle brake to effect steering. The right steer relay valve 430 has a valve element 432 located in the bore 433 while the left steer valve 431 has a valve element 434 located in the bore 436. Each of the valve elements have lands $a$, $b$, $c$, $d$, and $e$ of equal diameter located in their respective bores. Each of the steer relay valves are moved to the signal position shown when main line pressure is supplied by the first signal line 341 to each closed chamber 437 and 437' to act on each free end of land $a$ to move the valve elements 432 and 434 against the biasing force of springs 438 and 438'. When the first signal line 341 is exhausted, springs 438 and 438' will move the valves to the normal position. Exhausts 439 and 439' prevent the accumulation of fluid in the spring chambers.

In the signal position shown in FIG. 3b the right steer relay valve element 432 connects the right steer feed line 373 between the lands $a$ and $b$ to the right low ratio engaging device via line 444. The right vehicle brake apply line 446 is connected between lands $b$ and $c$ to the right brake lube line 447. The right lube feed line 384 is connected between the lands $c$ and $d$ to the transfer line 448.

Similarly in the signal position shown the left steer relay valve element 434, FIG. 3a, connects the left steer feed line 383 between the lands $a$ and $b$ to the left low brake line 449, the left vehicle brake apply line 451 between the lands $b$ and $c$ to the left vehicle brake lube line 452 and the left lube feed line 374 to the transfer line 453. The left low brake branch line 454 is blocked in this valve position.

On exhaust of the first signal line 341 the springs 438 and 438' move the valve elements 432 and 434 to the normal or upper position as shown in FIGS. 3b and 3a. In this position the right steer valve element 432 connects the right steer feed line 373 between the lands $b$ and $c$ to the right vehicle brake apply line 446, the right lube feed line 384 between the lands $c$ and $d$ to the right vehicle brake lube line 447 and the right low brake apply line 444 via branch 444' between the lands $d$ and $e$ to right transfer line 448. The left steer relay valve element 434 in the normal position similarly connects the left transfer line 453 between the lands $d$ and $e$ to the left low brake line branch 454 which is connected to the brake line 449, the left lube feed line 374 between the lands $c$ and $d$ to the left vehicle brake lube line 452 and the left steer feed line 383 between the lands $b$ and $c$ to the left vehicle brake apply line 451.

Drive relay valves

The right and left drive relay valves 460, FIG. 3c, and 461, FIG. 3a, also located in valve body 325 control the supply of the drive feed lines to engage the proper ratio devices of the cross drive unit during straight forward drive. The right relay valve 460 has a valve element 462 located in a bore 463. The left drive relay valve 461 has a valve element 466 located in a bore 467. Each of the valve elements 462 and 466 have lands $a$, $b$ and $c$ of equal diameter and are normally urged to the normal position shown by springs 468 and 468'. When fluid is supplied by second signal line 349, it enters the closed end of the bores to act on the free ends of land $a$ of each valve element to move both of the valve elements 462 and 466 down to the signal position against the biasing force of the springs 468 and 468'. The chambers for springs 468 are at all times connected to exhaust by exhausts 470 and 470'.

With the right drive relay valve 460 in the normal position shown, the right valve element 462 is located so that land $c$ blocks exhaust 471, the right drive feed line 369 is connected between the lands $b$ and $c$ to the right high clutch line 472 and the right transfer line 448 is connected between lands $a$ and $b$ to the right low lubrication line 473.

The left drive relay valve 461 has a valve element 466 which in the normal position shown connects the drive feed line 378 between the lands $b$ and $c$ to the left high clutch line 474 and the left transfer line 453 between the lands $a$ and $b$ to the left low lubrication line 476.

When pressure is supplied by the selector valve to the second signal line 349 this pressure acts in the closed ends of each of the right and left steer drive relay valves 460 and 461 on the lands $a$ of valve elements 462 and 466 respectively to move these valve elements down to the signal position against the biasing force of their respective springs 468 and 468'. Then the right valve element 462 connects the right high clutch line 472 to exhaust 471 between lands $b$ and $c$, the right drive feed line 369 between lands $a$ and $b$ to the right transfer line 448. The right low lubrication line 473 is blocked by land $a$.

Similarly, the left drive relay valve element 466 in the signal position connects the left high clutch line 474 between the lands $b$ and $c$ to exhaust 477, the left drive feed line 378 between lands $a$ and $b$ to the left transfer line 453. The left low tube line 476 is blocked by land $a$

Operation—Neutral

In the neutral position shown in the drawing, the input driven pump 322 supplies fluid to the control system via main line 323 at a moderate pressure regulated by the main pressure regulator valve 324. The main line pressure is connected through the lockup cut-off valve 521 and is blocked by the land $b$ of the lockup shift valve 522. The main line is also connected at the lockup cut-off valve 521 through the orifice 551 to the ratio feed line 552 which supplies fluid to the selector valve 328. The selector valve 328 supplies main line pressure to the first signal line 341 which acts on the end of the valve element 501 of regulator valve 324 to reduce the main line pressure from a high to a moderate value while the transmission is in neutral, intermediate and high. At the selector valve the low brake line 344 is conected to exhaust 346. The intermediate brake line 348, the high clutch line 347 and reverse line 351 are connected to exhaust 352 at selector valve so that all the gear ratios in the ratio unit 10 are disengaged to provide a positive neutral.

In order to condition the transmission for drive on the engagement of one of the gear drives of the ratio unit 10 the torque converter is conditioned for drive in the neutral position of the manual valve since the primary exhaust line 326 of the main regulator valve 324 is also the converter inlet line and supplies fluid to fill the torque converter operating chamber. The pressure in line 326 is regulated at a lower pressure than main line pressure by the converter pressure regulator valve 562. Main line pressure is also supplied by the selector valve 328 to the first signal line 341 to place the steer relay valves 430 and 431 in the signal position as shown. The springs hold the drive relay valves 460 and 461 in the normal position. With the steering control 386 in the straight ahead position shown in FIG. 3b, the steering valve unit or assembly 363 will connect main line 323 via branch 365 to both the right and left drive feed lines 369 and 378. The right drive feed line 369 is connected at right drive relay valve 460 between the lands b and c of valve element 462 to the right high clutch supply line 472 to actuate motor 84 and clutch 83 to engage high or direct drive of the right cross drive unit. The left drive feed line 378 is similarly connected by the left drive relay valve 461 between lands b and c of valve element 466 to the left high clutch line 474 to actuate motor 102 to engage the left drive clutch 101 to effect high or direct drive of the left cross drive unit. This conditions the cross drive transmission for the normal drives—low, intermediate and high.

*Straight drive in reverse, low, intermediate and high*

When the vehicle is started with the steering valve in the position shown for straight forward drive by moving selector valve 328 from the netural position to any one of these positions, reverse R, low LO, intermediate INT, and HI, for operation in that ratio, the drive relay valves 460 and 461 to remain biased by the springs 468 in the normal positions connecting the right and left drive feed lines 369 and 378 respectively to engage the right and left direct drive clutches 83 and 101 of the cross drive unit to provide direct drive or high in the cross drive unit as explained above. In shifting between these ratios the manual valve 328 controls the ratio unit 10 to provide a change in ratio, while the cross drive unit remains in high.

In high ratio HI the selector valve 328 connects the ratio feed line 552 which is supplied by the main line 323 via high clutch supply line 347 to engage the high clutch 51 to provide direct drive in the ratio unit. Thus, in high ratio both high or direct drive in both the cross drive unit and the ratio unit are engaged. The selector valve 328 in high also supplies fluid to the first signal line 341 to position the steer relay valves in the signal position shown to provide geared steer as explained below. Signal line 341 is also connected to the regulator valve to reduce the pressure regulated by the main pressure regulator valve 324 to a moderate value. The selector valve 328 connects all other lines to exhaust, low line 344 to exhaust 346, and intermediate line 348, low signal line 349 and reverse line 351 to exhaust 352.

When the selector valve 328 is moved to the intermediate position INT, ratio feed line 552 is connected to supply fluid to intermediate line 348 to engage intermediate brake 48 to establish intermediate ratio in the multi-ratio unit 10 and to the first signal line 341 to place steer relay valves 430 and 431 in the signal position to establish direct drive and geared steer as in high. This provides an intermediate ratio drive consisting of intermediate ratio in the ratio unit 10 and high ratio in the cross drive unit 11. The first signal line 341 also acts on the regulator valve to reduce line pressure to a moderate value. The low line 344 and high line 347 are connected to exhaust 346 and low low signal line 349 and reverse line 351 are connected to exhaust 352 by valve 328 to insure disengagement of all other ratios.

In the low position LO the selector valve 328 connects ratio supply line 552 to the low line 344 to engage low brake 39. The first signal line 341 is connected to exhaust 353 and the second signal line to exhaust 352 to position both the drive relay valves 460 and 461 and the steer relay valves 430 and 431 in normal position. Since the drive relay valves remain in the normal position, the drive in low range is a combination of low ratio in the transmission unit 10 and high ratio in the cross drive unit 11. Since the steer relay valves are moved to the normal position, clutch brake steering is provided as explained below in low range. The high line 347, intermediate line 348 and reverse line 351 are connected to exhaust to disengage these ratio drives.

In each of these drives—low, intermediate and high— the lockup shift valve 522, at a predetermined governor pressure provided by a predetermined speed of the intermediate shaft 21 as modified by the torque demand signal provided by the throttle pedal position, will upshift the valve to engage the lockup clutch 27. Since the speed of shaft 21 has a variable proportion to the road speed of the vehicle or the output shaft speed as determined by high, intermediate and low ratios of the gear unit 34, the transmission will function to engage the lockup clutch at a low speed in low ratio, at an intermediate speed in intermediate ratio, and at a high speed in high ratio.

When the lockup shift valve 522 upshifts to engage the lockup clutch in low and reverse, fluid pressure is supplied via line 538 and line 514 to the main pressure regulator valve 324 to reduce the line pressure. In high and intermediate the line pressure is reduced by the first signal pressure and lockup pressure does not effect a further reduction. This reduction of line pressure in low and reverse occurs regardless of whether the lockup cut-off valve 521 connects the supply of fluid to engage the lockup clutch 27 or disengages the lockup clutch. The lockup supply line 538 on an upshift of the lockup shift valve 522 is also connected with the lockup cut-off valve 521 in the normal position shown to the converter pressure regulator valve 562 to reduce the pressure of the fluid supplied to the torque converter operating chamber and to the lockup clutch cylinder 30 to engage the lockup clutch. When the lockup shift valve 522 downshifts, the lockup supply line 538 is exhausted exhausting line 514 to discontinue the effect of this pressure on the main pressure regulator valve and to exhaust line 554 to exhaust cylinder 30 and permit the converter pressure regulator valve 562 to regulate the pressure at a higher value to insure more efficient torque converter operation and to insure a pressure sufficient to quickly disengage the lockup clutch.

Whenever the transmission is manually shifted between low, intermediate and high ratios, there will be a flow of fluid through main line 323 through orifice 551 to the ratio feed line 552 and through the selector valve 328 to the ratio motor being engaged. The flow of pressure across orifice 551 will cause a pressure drop in the downstream side of lines 552 and 557 to reduce the pressure acting on the land c and permit the main line pressure acting on land a to shift the valve element 546 to the cut-off position connecting the lockup clutch supply line 554 to exhaust 542 to disengage the lockup clutch and increase the converter pressure to provide converter drive during the shift interval.

*Low low drive*

When the selector valve 328 is moved to the low low position, LO-LO, suitable for starting on steep inclines or under extremely heavy loads, this valve connects ratio feed line 552 to the low brake line 344 to engage the low brake 39 of the ratio unit 10 and to the low low or second signal line 349 which moves the drive relay valves 460 and 461 to the signal position. The steer valve assembly 363 in the forward position supplies fluid to both the right and left-hand drive feed lines 369 and 378. The right drive feed line 369 with the right drive relay valve element 462 in the signal position is connected between the lands a and b to the transfer line 448. The transfer line 448 with the right steer valve element 432 in the normal position is connected between lands *d* and *e* to the right low brake branch line 444' and line 444 to engage the right low brake motor 87 and brake 86. The left drive feed line 378 with valve element 466 of the left drive relay valve in the signal position is connected between lands *a* and *b* to the left transfer line 453. This transfer line with the valve element 434 of the left steer relay valve in the normal position is connected between the lands *d* and *e* to the low brake branch line 454 and line 449 to engage the left low brake motor 104 and brake 103 of the cross drive unit. Low ratio combines low ratio of the multiratio unit 10 and low ratio of the cross drive unit 11 to provide the lowest drive ratio. In low low ratio with the drive relay valves 460 and 461 in the signal position and the steer relay valves 431 in the normal position, clutch brake steer is provided as explained below.

In low low drive the lockup shift valve 522 will upshift to engage direct drive at a lower speed than in low ratio range drive since the cross drive unit is operating in a lower ratio and thus the intermediate shaft 21 will be rotating at a faster ratio in proportion to the output shaft speed of the cross drive unit or the road speed of the vehicle. On shifts to low low drive since only the cross drive unit is shifted there will be no flow through the ratio feed line 553 and the lockup clutch will not be disengaged by the lockup cut-off valve. On shifts from low low to other ratios the lock-up clutch will be disengaged.

When the manual valve 328 is moved to the reverse position, the ratio feed line 552 is connected only to reverse line 351 to engage the reverse band 367 of the multiratio unit 10. All other ratio lines supplied by the manual valve are connected by exhaust to disengage all other drives. The low line is connected to exhaust 353 through check valve 343 and line 342. High line 347 and intermediate line 348 are connected to exhaust 346 to release all other drives. The first signal line 341 and the second signal line 349 are connected respectively to exhausts 353 and 346. The steering valves as in low engage high in the cross drive and thus reverse provides reverse drive in the multiratio unit and high in the cross drive unit. The steer relay valve 431 is in the normal position to provide clutch brake steering as explained below. At the speeds encountered in reverse the lockup shift valve is normally not actuated.

*Steering operation—Intermediate and high ratios*

Since the steering operation for both right and left steering is basically the same, the following description of the operation of the control system describes the functioning of the control system for right steering and briefly points out how left steering functions in the same manner. In both high and intermediate ratios where either high or intermediate ratio respectively is established in multiratio gear unit 10 and direct drive or high ratio is established in the cross drive unit 11 for straight forward drive as explained above, the steering control system provides for geared steering by downshifting either the right or left drive unit of the cross drive transmission unit 11 to low ratio. The low ratio drive may be partially engaged or slipped to provide a variable degree of steering or fully engaged to provide a constant radius turn. When the manual steering control is moved for right steering the lever 386 of the steering valve assembly 363, FIG. 3b, is moved clockwise to positively depress drive feed valve element 367 to disconnect main line branch 365 from the right drive feed line 369 and to connect this line to exhaust 379. At the same time the spring 393 initially transmits and then the springs 393 and 396 transmit a force to the right steer valve element 371 proportional to the control position to open the right steer valve element 371 to connect the main line port 409 to supply a regulated pressure proportional to steer valve control position to the right steer feed line 373. Since the valve element 371 always seals bore 372 above the port for line 373 and the pressure in line 373 communicating through bore 408 acts upwardly on valve element 371 opposing the springs, the valve 371 acts as a regulator valve and regulates the pressure in line 373 proportional to the position of the lever 386. In intermediate and high ratios with the right steer relay valve 430 in the signal position shown, the right steer line 373 is connected between lands *a* and *b* of valve element 432 to the right low brake supply line 444 to apply the right low brake 86 to place the right gear unit of cross drive 11 in low ratio providing right geared steer.

Initial movement of the steering control, while acting only through the main spring 393, provides a slow increase in pressure compared to control movement until the clutch or brake is initially engaged and then acting through both springs provides a larger increase in pressure compared to the degree of control movement to permit the operator to quickly supply full line pressure for full engagement. The pressure supplied to the steer line 373 also acts upwardly on valve 371 and through springs 393 and 396 resists movement of the steering control lever 386 to provide a feel force so that the operator can feel and thus determine the degree of pressure being supplied to the low brake motor 87.

As soon as valve 371 starts regulating the pressure to steer line 373 the fluid also flows from main line port 409 through the bore 408 and is regulated by land or edge 410 and port 11 to supply a regulated pressure to the right lube feed line 384. Thus, valve 371 regulates both the pressure supplied to the steer feed line 373 and the volume of flow to the lube feed line 384. When the volume of flow required to maintain the regulated pressure for the steer feed line 373 is high, the volume of flow to the lube feed line 384 is reduced. To insure that a minimum supply of cooling fluid is always fed to lube feed line 384 the orifice bypass 412 connects the steer feed line 373 to the lube feed line 384. The lube feed line 384 in both intermediate and high is connected between the lands *c* and *d* of right steer relay valve element 432 and via transfer line 448 and between the lands *a* and *b* of right drive valve element 462 to the right low lubrication line 473 to lubricate the right low brake.

On return to straight forward drive main line port 409 is blocked by valve 371 to discontinue the supply of fluid to the right steer feed line and this line exhausts via port 411 and orifice line 412 to the lubrication feed line 384 to disengage the right low brake. At the same time main line port 365 is connected to the right drive feed line 369 to re-establish high ratio in the cross drive unit.

The anti-reverse steer valve unit 416 controls the exhaust line 379 for the drive feed line 369 to provide overlap when the engine is delivering low torque or preferably only on engine overrun. On a normal steering shift as explained above, the exhaust line 379 is connected via port 426 to exhaust 427. However, during high engine manifold vacuum particularly on engine overrun, when the vehicle is driving the engine and the transmission is transmitting negative torque, or in addition when the engine is transmitting substantially no power to the transmission, the vacuum in chamber 423 is sufficient to overcome spring 425 to move valve element 417 to close port 426 and block exhaust 379 to prevent exhaust of the drive feed line 369 and disengagement of the high drive unit of the cross drive unit. In order to prevent release of high drive due to leakage in the system, the drive valve 367 has a slotted extension 404 of port 402 to provide the small flow from the main line port 365 to the drive feed line 369 sufficient to make up for leakage, thus insuring that the drive feed line continues engagement of high drive during this period when the exhaust is blocked to provide controlled overlap. If the engine manifold vacuum should drop during this period, valve 417 will open exhaust line 379 to terminate overlap. However, if the manifold vacuum continues high, the valve remains in the closed position providing overlap until the pressure increases in line 373 to the point where low ratio is partially engaged sufficiently to initiate the torque transmission and drive in low ratio. Then the line pressure in line 373 increases to move shuttle 428 to the left permitting communication between line 373 and line 429 to provide a pressure acting on the unbalanced area of land $b$ to open valve 417 to free exhaust through line 379 to quickly disengage high ratio.

For left steering lever 386 is moved in a counterclockwise direction and similarly cuts off the supply of main line fluid from port 365 to the left drive feed line 378 and connects this line to exhaust 379. At the same time with the same feel arrangement, fluid is supplied under a pressure increasing with increasing valve movement to the steer feed line 383 which is connected by the left steer relay valve 431 to the left low brake supply line 449 to supply the left low brake 103. The steer valve 381 will also supply cooling fluid to the left lubrication line 374 which is connected through the left steer relay valve 431 and the left drive relay valve 461 to the left low lubrication line 476. Orifice bypass line 414 insures whenever fluid is supplied to the steer feed line 383 a minimum supply of fluid to the lubricating line 374 and provides for exhaust of fluid from the steer feed line 383 upon disengagement of the steering drive. The anti-reverse steer valve will similarly on engine overrun block exhaust line 379 to provide overlap until the low steering drive is engaged.

*Steering operation—Low and reverse*

When the selector valve 328 is placed in low or reverse ratio position, the multiratio unit 10 is in low or reverse ratio respectively. The first and second signal lines 341 and 349 are vented at the selector valve to place both the right and left drive relay valves and right and left steer relay valves in the normal position to provide clutch brake steer. During straight forward drive the main line pressure at port 365 is connected by the right drive valve element 367 to the right drive feed line 369 which is connected via the right drive relay valve 460 to the right high clutch line 472 to engage the right high or direct drive clutch 83. The left clutch is similarly engaged. On right steer clockwise movement of the lever 386 depresses drive valve element 367 to first cut off the supply of main line pressure from port 365 to the right drive feed line 369 and the right clutch motor 84 and then connects this clutch motor via line 369 to the exhaust line 379 to disengage the high clutch 83. At the same time the spring 393 and with continued movement the spring 396 moves the steer valve element 371 down to connect the main line port 409 to the right steer feed line 373. The pressure increase in line 373 is controlled as explained above by the degree of force the operator applies to the manual steering control tending to move the valve unit 364 down against the pressure in line 373. The right steer feed line 373 is connected by the right steer relay valve element 432 between the lands $b$ and $c$ to the right vehicle brake apply line 446 to actuate the right vehicle brake motor 91 to engage the vehicle brake 88 retarding the right output shaft 82 to effect right steering. This operation of the steering control will provide right clutch brake steering in both forward and reverse.

When the steer valve 371 is regulating pressure to the right steer feed line 373 to engage the brake, pressure is also supplied in the same manner as explained above to the right lubrication feed line 384. This line is connected between the lands $c$ and $d$ of the right steer relay valve element 432 in the normal position to the right vehicle brake lube line 447 to lubricate the right vehicle brake. The anti-reverse steer valve 416 functions during clutch brake steering in the low and reverse ranges to provide overlap between the disengagement of the clutch and the engagement of the brake to prevent reverse steering in the same way that it provides overlap during geared steer operation described above for high and intermediate ratios. The anti-reverse valve unit 416 blocks the high clutch exhaust by closing exhaust line 379 under high vacuum conditions indicating engine overrun to hold the high clutch engaged until the brake is substantially engaged to a degree sufficient to initiate steering. While the exhaust is blocked bleed 404 provides a sufficient flow to make up leakage to keep the high clutch engaged. When the pressure supplied to the vehicle brake 88 builds up sufficiently to partially engage the brake sufficiently to initiate steering, the pressure in line 373 acting through line 429 on the land $b$ of valve element 417 opens the valve to permit exhaust from port 426 and 427 to release the high clutch 83.

In low and reverse ratios left steering is provided in substantially the same manner. As the left steer valve 363 is moved down the drive valve element 376 cuts off the supply of fluid to the left drive feed line 378 which is connected through the left drive relay valve 461 to the left high clutch 101. At the same time in accordance with increasing pressure in the steer control an increasing regulated fluid pressure is supplied to the left steer feed line 383. This line is connected to the left steer relay valve 431 in the normal position to the left vehicle brake apply line 451 to apply the left vehicle brake 112. While fluid is supplied to the left steer feed line 383, fluid is also supplied in the same manner to the left lubrication feed line 374 which is connected by the left steer relay valve 431 to the left vehicle brake lubrication line 452 to lubricate the left brake 112.

*Steering operation—Low low drive*

When the selector valve 328 is placed in the low low ratio position, low ratio is engaged in the multiratio unit and low ratio is engaged in the cross drive unit 11 for normal forward drive as explained above. The steer relay valves 430 and 431 are in the normal position and the drive relay valves 460 and 461 are in the signal position. During right steering downward movement of the right steer valve unit 364 through the action of valve element 367 terminates the supply of fluid from main line port 365 to the right drive feed line 369. The right drive feed line is connected in low low through the right drive relay valve 460 in the signal position via transfer line 448 to the right steer relay valve element 432 which in the normal position connects the supply to the right low brake line 444 to supply the right low brake 86. Downward movement of valve element 367 blocks this supply to brake 86 and connects the right low brake motor 87 through line 369 to exhaust 379 to disengage the low brake. At the same time the right steer valve element 371 is moved down to connect main line port 409 and to regulate the main line pressure supplied to the right steer feed line 373. As in the above steering operation, the pressure developed in the right steer feed line 373 acts on valve element 371 to provide feel resistance so that the pressure supplied is proportional to the pressure the operator is required to apply to the control system or lever. The right steer fed line 373 is connected at the right steer relay valve 430 in the normal position between lands $b$ and $c$ of valve element 432 to the right veheicle brake apply line 446 which actuates the motor 92 to engage the right vehicle brake 88. As in other steering operations described above, the steer valve 371 also supplies right lubrication feed line 384 which is connected by the right steer valve element 432 between the lands $c$ and $d$ to the right vehicle brake lubrication line 447 to lubricate the right brake.

During this phase of operation the anti-reverse steer valve 416 functions in the manner described above to prevent disengagement of the low brake 86 by controlling exhaust line 379 before engagement of the vehicle brake 88 during vehicle overrun or coasting. As soon as pressure develops in the motor 91 to apply brake 88 sufficiently to prevent anti-reverse steering, there is a pressure increase in line 373. This pressure acting through shuttle valve 428 in line 429 opens valve element 417 to permit exhaust from line 379.

The vehicle brakes 88 and 112 may be applied by a linkage as shown in Patent No. 2,912,884 connected to ears 95 and 118 to rotate annular pistons 92 and 114 to mechanically apply the brakes. The initial mechanical movement initially engages the brakes due to the action of the balls and cams 94 and 117. After initial engagement of the pistons with the rotating brake plate, the brake plate transmits a rotary force to the piston to provide an additional self-energized brake application force. When the brakes are applied hydraulically by fluid pressure supplied to the cylinder on initial engagement, the ball ramps provide a similar added self-energizing braking force.

In the above description of a specific embodiment of the invention for convenience and clairity in reference to certain phases of the operation and location of the valve, terms such as "up" and "down" have been used. It will be appreciated that the specific position of these valves is immaterial to their functioning as described above and that they may therefore be positioned in any manner desirable from a structural or an assembly viewpoint.

The above described specific embodiment of the invention is illustrative of the invention, and it will be appreciated by those skilled in the art that modifications may be made in accordance with the scope of the appended claims.

We claim:

1. In a transmission, a multi-ratio drive unit having driven means providing a plurality of drive ratios, a cross-drive transmission unit having a right and a left output members and a right and a left two speed gear unit connecting said driven means respectively to each of said right and left output members, a right and a left brake operable to retard respectively said right and left output members, ratio control means to selectively actuate said multi-ratio drive unit to selectively provide each of said plurality of drive ratios, steering control means having a manual steering control movable to right and left steering positions including means connected to and controlled by said ratio control means and connected to said right and left two speed gear units and brakes to selectively provide right and left geared steering in one drive ratio of said multi-ratio drive unit by selectively reducing the drive ratio of said right and left two speed unit from the higher to the lower speed ratio, and to selectively provide clutch brake steering in another ratio of said multi-ratio drive unit by selectively disengaging the drive of said right and left two speed gear unit connected to the right and left output members and selectively engaging the brake for the selectively disengaged one of the right and left output members.

2. In a transmission, a multi-ratio drive unit having driven means providing reverse, low, intermediate and high drive ratios, a cross-drive transmission unit having a right and a left output members, and a right and a left two sped gear unit connecting said driven means respectively to each of said right and left output members, a right and a left brake operable to retard respectively said right and left output members, ratio control means to selectively actuate said multi-ratio drive unit to selectively provide each of said plurality of drive ratios, steering control means having a manual steering control movable to right and left steering positions including means connected to and controlled by said ratio control means and being connected to said right and left two speed gear units and brakes to selectively provide right and left geared steering in said intermediate and high drive ratios of said multi-ratio drive unit by selectively reducing the drive ratio of said right and left two speed unit from the higher to the lower speed ratio, and to selectively provide clutch brake steering in said reverse and low ratios of said multi-ratio drive unit by selectively disengaging the drive of said right and left two speed gear unit and right and left output members and selectively engaging the brake for the selectively disengaged one of the right and left output members.

3. In a transmission, a multi-ratio drive unit having driven means providing a plurality of drive ratios, a cross-drive transmission unit having a right and a left output member, and a right and a left two speed gear unit connecting the cross drive shaft respectively to each of said right and left output members providing a high and a low speed drive, a right and a left brake operable to retard respectively said right and left output member, ratio control means to selectively actuate said multi-ratio drive unit to selectively provide each of said plurality of drive ratios, steering control means having a manual steering control movable to right and left steering positions including means connected to and controlled by said ratio control means and connected to said right and left two speed gear units and brakes to selectively provide right and left geared steering in one drive ratio of said multi-ratio drive unit by selectively reducing the drive ratio of said right and left two speed unit from said high to said low speed drive, and to selectively provide clutch brake steering in another ratio of said multi-ratio drive unit by selectively disengaging said high drive of said right and left two speed gear unit and selectively engaging said right and left brake, and said ratio control means being operative in said another ratio to establish a lower ratio of said multi-ratio drive unit and said low ratio of said right and left two speed gear units and to condition said steering control means to selectively disengage said low ratio of one of said right and left two speed gear units connected to the right and left output members and selectively engage the one of said brakes connected to the disengaged output member to provide clutch brake steering.

4. In a transmission adapted to be driven by an engine, a throttle control for an engine movable from low throttle position to a full throttle position, a cross drive transmission unit having input means, a right and a left output member, a right and a left cross drive unit having drive means connecting said input means respectively to said right and left output members each having one means providing a high speed drive from said input means to one of said output members and another means to slow the rotative speed of said output members, steering control means having a manual steering control movable to right and left steering positions, including means connected to said cross drive gear units to selectively control each of said cross drive units to provide said high speed drive and to slow the rotative speed of said output members and means effective only when said throttle control is in lower throttle positions to hold said one means effective to provide said high speed drive during the initiation of engagement of said another means to prevent excessive coasting.

5. In a transmission adapted to be driven by an engine, a throttle control for an engine movable between a closed thottle position, through a middle throttle position to a full throttle position, a cross drive transmission unit having input means, a right and a left output member, a right and a left cross drive unit having drive means connecting said input means respectively to said right and left output members each having one means providing a high speed drive from said input means to one of said output members and another means to slow the rotative speed of said output members, steering control means having a manual steering control movable to right and left steering positions, including means connected to said cross drive gear units to selectively control each of said cross drive units to provide said high speed drive and to slow the rotative speed of said output members and throttle controlled means effective to control said steering control means to control the degree of overlap during steering.

6. In a transmission adapted to be driven by an engine, a throttle control for an engine movable between a closed throttle position, through a middle throttle position to a full throttle position, a cross drive transmission unit having input means, a right and a left output member, a right and a left cross drive unit having driving means connecting said input means respectively to said right and left output members each having one means providing a high speed drive from said input means to one of said output members and another means to slow the rotative speed of said output members, steering control means having a manual steering control movable to right and left steering positions, including means connected to said cross drive units to selectively control each of said cross drive units to normally provide said high speed drive and operative to slow the rotative speed of the output member of the selected cross drive unit, holding means effective only when said throttle is between said closed throttle position and said middle throttle position to hold said one means engaged to provide said high speed drive of the selected cross drive unit, and means to disable said holding means when said another means is engaged to slow the rotative speed of said output member of the selected cross drive unit for steering.

7. In a transmission adapted to be driven by an engine, a throttle control for an engine movable between a closed throttle position, through a middle throttle position to a full throttle position, a cross drive transmission unit having input means, a right and a left output member, a right and a left cross drive unit having drive means connecting said input means respectively to said right and left output members each having one means providing a speed ratio drive from said cross drive shaft to one of said output members and another means to slow the rotative speed of said output members, steering control means having a manual steering control movable to right and left steering positions, including means connected to said cross drive gear units to selectively control each of said cross drive units to normally engage the one means to provide said speed ratio drive and operative to disengage said one means and engage said another means to slow the rotative speed of said output member of the selected cross drive unit and means effective only when said throttle is between said closed throttle position and said middle throttle position to hold said one means effective to provide said high speed drive until said another means is engaged to slow the rotative speed of said output member of the selected cross drive unit.

8. The invention defined in claim 7 and said another means being a reduction gear drive to slow the rotative speed of said output members.

9. The invention defined in claim 7 and said another means being a brake to slow the rotative speed of said output members.

10. In a transmission adapted to be driven by an engine, a throttle control for an engine movable between a closed throttle position, through a middle throttle position to a full throttle position, a multi-ratio drive unit having output means providing a plurality of drive ratios, a cross drive transmission unit having a right and a left output member and a right and a left two speed gear unit connecting said output means respectively to each of said right and left output members, a right and a left brake operable to retard respectively said right and left output member, ratio control means to selectively actuate said multi-ratio drive unit to selectively provide each of said plurality of drive ratios, steering control means having a manual steering control movable to right and left steering positions and means connected to and controlled by said ratio control means and being connected to said right and left two speed gear units and brakes to selectively provide right and left geared steering in one drive ratio of said multi-ratio drive unit by selectively reducing the drive ratio of said right and left two speed unit from the higher to the lower speed ratio, and to selectively provide clutch brake steering in another ratio of said multi-ratio drive unit by selectively disengaging the drive of said right and left two speed gear units and selectively engaging said right and left brake, and throttle controlled means to control the degree of overlap during steering control.

11. In a transmission adapted to be driven by an engine, a throttle control for an engine movable between a closed throttle position, through a middle throttle position to a full throttle position, a multi-ratio drive unit having output means providing a plurality of drive ratios, a cross drive transmission unit having a right and a left output member, and a right and a left two speed gear unit connecting said output means respectively to each of said right and left output members, a right and a left brake operable to retard respectively said right and left output members, ratio control means to selectively actuate said multi-ratio drive unit to selectively provide each of said plurality of drive ratios, steering control means having a manual steering control movable to right and left steering positions and means connected to and controlled by said ratio control means and being connected to said right and left two speed gear units and brakes to selectively provide right and left geared steering in one drive ratio of said multi-ratio drive unit by selectively reducing the drive ratio of said right and left two speed unit from the higher to the lower speed ratio, and to selectively provide clutch brake steering in another ratio of said multi-ratio drive unit by selectively disengaging the drive of said right and left two speed gear units and selectively engaging said right and left brake, and means effective only when said throttle is between said closed throttle position and said middle throttle position to overcontrol said steering control means to hold said higher speed ratio engaged until said lower speed ratio is engaged during geared steering and to hold the drive engaged until the brake is engaged for clutch brake steering.

12. In a transmission, a cross drive transmission unit having input means, a right and a left output member, a right and a left cross drive unit having drive means connecting said input means respectively to said right and left output members each having one means providing a high speed drive from said input means to one of said output members and another means to slow the rotative speed of said one output member, a source of fluid under pressure, steering control valve means including right and left valve units and a manual control moving said valve units from a neutral position for straight drive, the right valve unit being moved in one direction and the left valve in the opposite direction for right steering and the left valve unit moving in said one direction and the right valve unit moving in the opposite direction for left steering, each of said right and left valve units normally connecting said source to said right and left one means respectively and on movement in said one direction connecting said right and left one means to exhaust and connecting said source to said right and left another means and regulating the pressure at increasing values with increased movement of said manual control.

13. In a transmission, a cross drive transmission unit having input means, a right and a left output member, a right and a left cross drive unit having drive means connecting said input means respectively to said right and left output members and each having one means providing a high speed drive from said cross drive shaft to one of said output members and another means including a fluid operated friction device to slow the rotative speed of said one output member, a right and a left cooling line connected to said another means, a source of fluid under pressure, steering control valve means including right and left valve units and a manual control moving said valve units from a neutral position for straight drive, the right valve unit being moved in one direction and the left valve in the opposite direction for right steering and the left valve unit moving in said one direction and the right valve unit moving in the opposite direction for left steering, each of said right and left valve units normally connecting said source to said right and left one means respectively and on movement in said one direction connecting said right and left one means to exhaust and connecting said source to said right and left another means and regulating the pressure at increasing values with increased movement of said manual control and on movement in the opposite direction connecting said source to said left and right cooling lines respectively.

14. In a transmission, a cross drive transmission unit having input means, a right and a left output member, a right and a left cross drive unit having drive means connecting said input means respectively to said right and left output members each having one means providing a high speed drive from said input means to one of said output members and another means including a fluid operated device to slow the rotative speed of said one output member, a controlled exhaust, a source of fluid under pressure, steering control valve means including right and left valve units and a manual control moving said valve units from a neutral position for straight drive, the right valve unit being moved in one direction and the left valve in the opposite direction for right steering and the left valve unit moving in said one direction and the right valve unit moving in the opposite direction for left steering, each of said right and left valve units normally connecting said source to said right and left one means respectively and on movement in said one direction connecting said right and left one means to said controlled exhaust and connecting said source to said right and left another means, and means to block said controlled exhaust until said another means is initially engaged.

15. In a transmission for an engine having a throttle control movable from a closed position through a range of low positions to a high position, a cross drive transmission unit having input means, a right and a left output member, a right and a left cross drive unit having drive means connecting said input means respectively to said right and left output members each having one means providing a high speed drive from said input means to one of said output members and another means including a fluid operated device to slow the rotative speed of said one output member, a controlled exhaust, a source of fluid under pressure, steering control valve means including right and left valve units and a manual control moving said valve units from a neutral position for straight drive, the right valve unit being moved in one direction and the left valve in the opposite direction for right steering and the left valve unit moving in said one direction and the right valve unit moving in the opposite direction for left steering, each of said right and left valve units normally connecting said source to said right and left one means respectively and on movement in said one direction connecting said right and left one means to said controlled exhaust and connecting said source to said right and left another means, and means operative during movement of said throttle control in said range of low positions to block said controlled exhaust and movable to open said exhaust when a predetermined pressure is supplied to said one means sufficient to initiate engagement of said one means.

16. In a transmission, a cross drive transmission unit having input means, a right and a left output member, a right and a left cross drive unit having drive means connecting said input means respectively to said right and left output members each having one means providing a high speed drive from said cross drive shaft to one of said output members and another means including a fluid operated device to slow the rotative speed of said one output member, a controlled exhaust, a source of fluid under pressure, steering control valve means including right and left valve units and a manual control moving said valve units from a neutral position for straight drive, the right valve unit being moved in one direction and the left valve in the opposite direction for right steering and the left valve unit moving in said one direction and the right valve unit moving in the opposite direction for left steering, each of said right and left valve units normally connecting said source to said right and left one means respectively and on movement in said one direction maintaining a limited make up feed sufficient to supply leakage fluid and connecting said right and left one means to a controlled exhaust and connecting said source to said right and left another means, and means to block said controlled exhaust until engagement of said another means is initiated to permit said limited make up feed to hold said one means engaged to provide overlap.

17. In a transmission, input means, right and left output members, a cross drive unit connecting said input means to said output members having a right and a left gear unit providing a high and a low drive to each of said output members and having fluid operated steer means to selectively establish each drive, and fluid operated right and left brake means operably connected to retard said right and left output members respectively, a source of fluid under pressure, right and left drive feed lines and steer feed lines, steer control valve means normally connecting said source to said right and left drive feed lines and operative on right and left steering control movement to selectively disconnect said source from said right and left drive feed line and connect it to exhaust and to selectively connect said source to said right and left steer feed line, relay valve means normally connecting said right and left drive feed lines to said right and left high fluid operated high drive and said right and left steer feed lines to said right and left fluid operated brake to provide clutch brake steer and operative in a first controlled position to change the connection of said right and left steer feed lines to said right and left brake to provide geared steer and operative in a second controlled position to change the connection of said right and left drive lines to said right and left fluid operated low drive to provide a lower drive and clutch brake steer.

18. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross-drive unit connecting said intermediate member to said output member having a right and a left gear unit providing a high and a low drive to each of said output members and having fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratios in said multi-ratio drive unit and to provide in one ratio a first signal pressure and in another ratio a second signal pressure, steer control means operative under the control of said first signal pressure to connect said source to engage the right ratio of said right and left drive units and operative on movement to right and left steering positions to disengage said high ratio and engage said low ratio selectively of said right and left gear unit to provide geared steer and controlled by said second signal pressure in another of said ratio positions to establish said low drive of said right and left drive units and operative on movement to right and left steering positions to selectively disengage said right and left low drive and engage said right and left brake to provide clutch brake steer.

19. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross-drive unit connecting said intermediate member to said output members having a right and a left gear unit providing a high and a low drive to each of said output members and having fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratios in said multi-ratio drive unit and to provide in one ratio a signal pressure, steer control means operative under the control of said signal pressure to connect said source to engage said high ratio of said right and left drive units and operative on movement to right and left steering positions to disengage said high ratio and engage said low ratio selectively of said right and left gear unit to provide geared steer and normally operative without signal pressures in other drive ratios to engage the high ratio of said right and left drive units and operative on movement to right and left steering positions to selectively disengage said right and left high drive and engage said right and left brake to provide clutch brake steer.

20. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross-drive unit connecting said intermediate member to said output members having a right and a left gear unit providing a high and a low drive to each of said output members and having fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratios in said multi-ratio drive unit and to provide in one ratio a signal pressure, steer control means normally operative without signal pressures in other drive ratios to engage the high ratio of said right and left drive units and operative on movement to right and left steering positions to selectively disengage said right and left high drive and engage said right and left brake to provide clutch brake steer, and controlled by said signal pressure in another of said ratio positions to establish said low drive of said right and left drive units and operative on movement to right and left steering positions to selectively disengage said right and left low drive and engage said right and left brake to provide clutch brake steer.

21. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross-drive unit connecting said intermediate member to said output members having a right and a left gear unit providing a high and a low drive to each of said output members and having fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratios in said multi-ratio drive unit and to provide in one ratio a first signal pressure and in another ratio a second signal pressure, steer control means operative under the control of said first signal pressure to connect said source to engage said high ratio of said right and left drive units and operative on movement to right and left steering positions to disengage said high ratio and engage said low ratio selectively of said right and left gear units to provide geared steer and normally operative without signal pressures in other drive ratios to engage the high ratio of said right and left drive units and operative on movement to right and left steering positions to selectively disengage said right and left high drive and engage said right and left brake to provide clutch brake steer, and controlled by said second signal pressure in still another of said ratio positions to establish said low drive of said right and left drive units and operative on movement to right and left steering positions to selectively disengage said right and left low drive and engage said right and left brake to provide clutch brake steer.

22. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross drive unit connecting said intermediate member to said output members having a right and a left gear unit providing a high and a low drive to each of said output members and having fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratios in said multi-ratio drive unit, right and left drive feed lines and steer feed lines, steer control valve means normally connecting said source to said right and left drive feed lines and operative on right and left steering control movement to selectively disconnect said source from said right and left drive feed line and connect it to exhaust and to selectively connect said source to said right and left steer feed line, relay valve means normally connecting said right and left drive feed lines to said right and left high fluid operated high drive and said right and left steer feed lines to said right and left fluid operated brake to provide clutch brake steer and operative when said manual control valve is in one position to change the connection of said right and left steer feed lines to said right and left brake to provide geared steer and operative when said manual control valve is in another position to change the connection of said right and left drive lines to said right and left fluid operated low drive to provide a lower drive and clutch brake steer.

23. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross drive unit connecting said intermediate member to said output members having a right and a left gear unit providing a high and a low drive to each of said output members and having fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratios in said multi-ratio drive unit and to provide in one ratio a signal pressure, right and left drive feed lines and steer feed lines, steer control valve means normally connecting said source to said right and left drive feed lines and operative on right and left steering control movement to selectively disconnect said source from said right and left drive feed line and connect it to exhaust and to selectively connect said source to said right and left steer feed line, relay valve means normally connecting said right and left drive feed lines to said right and left high fluid operated high drive and said right and left steer feed lines to said right and left fluid operated brake to provide clutch brake steer and operative by said signal pressure to change the connection of said right and left drive lines to said right and left fluid operated low drive to provide a lower drive and clutch brake steer.

24. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross drive unit connecting said intermediate member to said output members having a right and a left gear unit providing a high and a low drive to each of said output shafts and having fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratio in said multi-radio drive unit and to provide in one ratio a signal pressure, right and left drive feed lines and steer feed lines, steer control valve means normally connecting said source to said right and left drive feed lines and operative on right and left steering control movement to selectively disconnect said source from said right and left drive feed line and connect it to exhaust and to selectively connect said source to said right and left steer feed line, relay valve means normally connecting said right and left drive feed lines to said right and left high fluid operated high drive and said right and left steer feed lines to said right and left fluid operated brake to provide clutch brake steer and operative by said signal pressure to change the connection of said right and left steer feed lines to said right and left brake to provide geared steer.

25. In a transmission, an input member, an intermediate member, a right and a left output member, a fluid actuated multi-ratio transmission drive unit connecting said input member to said intermediate member to provide a plurality of drive ratios and having fluid actuated ratio drive means to selectively establish each of said drive ratios, a cross drive unit connecting said intermediate member to said output members having a right and a left gear unit having a high and a low drive to each of said output members and including fluid operated steer drive means to selectively establish each drive, and fluid operated right and left brake means operably connected to retard said right and left output members respectively, a source of fluid under pressure, a manual control valve selectively connecting said source to each of said fluid actuated ratio drive means to establish each of said plurality of ratios in said multi-ratio drive unit and to provide in one ratio a first signal pressure and in another ratio a second signal pressure, right and left drive feed lines and steer feed lines, steer control valve means normally connecting said source to said right and left drive feed lines and operative on right and left steering control movement to selectively disconnect said source from said right and left drive feed line and connect it to exhaust and to selectively connect said source to said right and left steer feed line, relay valve means normally connecting said right and left drive feed lines to said right and left high drive and said right and left steer feed lines to said right and left fluid operated brake to provide clutch brake steer and operative by said first signal pressure to change the connection of said right and left steer feed lines to said right and left brake to provide geared steer and operative by said second signal pressure to change the connection of said right and left drive lines to said right and left low drive to provide a lower drive and clutch brake steer.

26. In a transmission adapted to be driven by an engine and driving a load, a cross drive transmission unit havng input means, a right and a left output member, a right and a left cross drive unit having drive means connecting said input means respectively to said right and left output members each having one means providing a high speed drive from said input shaft to one of said output members and another means to slow the rotative speed of said one of said output members, steering control means having a steering control movable to right and left steering positions, including means connected to said cross drive gear units to selectively control each of said cross drive units to selectively actuate said means to provide said high speed drive and said means to slow the rotative speed of said output shafts and means effective only when less than a predetermined low positive torque is being applied to said transmission input means to hold said one means effective to provide said high speed drive during the initiation of engagement of said another means to prevent reverse steering during coasting.

27. The invention defined in claim 26 and said last mentioned means being actuated by engine manifold vacuum.

28. The invention defined in claim 26 and said engine including a throttle control and said last mentioned means being actuated by said throttle control only at very low throttle positions.

29. In a transmission adapted to be driven by an engine and driving a load, a cross drive transmission unit having input means, a right and a left output member, a right and a left cross drive unit having drive means connecting said input means respectively to said right and left output members each having one means providing a high speed drive from said input means to one of said output members and another means to slow the rotative speed of said one of said output members, steering control means having a steering control movable to right and left steering positions, including means connected to said cross drive gear units to selectively control each of said cross drive units to selectively actuate said means to provide said high speed drive and said means to slow the rotative speed of said output shafts and means effective only when the transmission is transmitting negative torque from said load to said engine to hold said one means effective to provide said high speed drive during the initiation of engagement of said another means to prevent reverse steering during coasting.

30. The invention defined in claim 29 and said last named means being actuated by engine manifold vacuum.

31. In a transmission, a cross drive transmission unit having input means, a right and a left output member, a right and a left cross drive unit having drive means connecting said input means respectively to said right and left output members each having one means providing a high speed drive from said input means to one of said output members and another means to slow the rotative speed of said one of said output members, a source of fluid under pressure, steering control valve means including right and left valve units and a manual control moving said valve units from a neutral position for straight drive, the right valve unit being moved in one direction and the left valve in the opposite direction for right steering and the left valve unit moving in said one direction and the right valve unit moving in the opposite direction for left steering, each of said right and left valve units normally connecting said source to said right and left one means respectively and on movement in said one direction connecting said right and left one means to exhaust and connecting said source to said right and left another means and regulating the pressure at increasing values with increased movement of said manual control and including a port providing a supply of cooling fluid, and means connecting said supply of cooling fluid to said another means.

32. The invention defined in claim 31 and said right and left valve units on movement in said opposite directions providing a supply of cooling fluid, and means connecting said supply of cooling fluid to said another means being engaged.

33. The invention defined in claim 31 and said right and left valve units on said movement in one direction during regulation of the pressure supplied to said right and left another means connecting the excess to said port providing a supply of cooling fluid, and means connecting said supply of cooling fluid to said another means.

34. The invention defined in claim 31 and said right and left another means on disengagement being connected to said port providing a supply of cooling fluid.

35. In a transmission, a cross drive transmission unit having input means, a right and a left output member, a right and a left cross drive unit having drive means connecting said input means respectively to said right and left output members each having one means providing a high speed drive from input means to one of said output members and another means to slow the rotative speed of said one of said output members, a source of fluid under pressure, steering control valve means including right and left valve units and a manual control moving said valve units from a neutral position for straight drive, the right valve unit being moved in one direction and the left valve in the opposite direction for right steering and the left valve unit moving in said one direction and the right valve unit moving in the opposite direction for left steering, each of said right and left valve units including means normally connecting said source to said right and left one means respectively and on movement in said one direction connecting said right and left one means to exhaust and means connecting said source to said right and left another means and regulating the pressure at increasing values with increased movement of said manual control, right and left cooling lines connected to said right and left another means, and said right and left valve units also including means to connect said source to said right and left cooling lines only during the supply of fluid to said right and left another means, and means to limit the supply of cooling fluid to insure a proper supply of fluid to said another means and means to exhaust said right and left another means to said right and left cooling lines.

36. The invention defined in claim 35 and said means of said right and left valve units, connecting said source to said right and left cooling lines respectively.

37. The invention defined in claim 35 and said means of said right and left valve units, connecting said source to said right and left cooling lines reversely.

38. The invention defined in claim 35 and said means of said right and left valve units, connecting said source to said right and left cooling lines providing a predetermined minimum flow and means connecting the exhaust from said means connecting said source to said right and left another means and regulating the pressure to said right and left cooling lines.

39. In a transmission, ratio drive means having input and output means and a pair of fluid actuated ratio engaging devices, a source of fluid under pressure, a shift valve having a first position providing a full flow connection from said source to one ratio engaging device and connecting the other ratio engaging device to exhaust and a second position providing a restricted flow connection from said source to said one ratio engaging device sufficient to make up the leakage of the lines and connecting said source to said other ratio engaging device, and exhaust control means to time the overlap on a shift from said first position to said second position connecting said one ratio engaging device to exhaust on engagement of said second ratio device.

40. The invention defined in claim 39 and means to disable said exhaust control means only when appreciable torque is applied to said input means.

41. The invention defined in claim 39 and means to render said exhaust control means operative only when torque is being transmitted from said output means to said input means of said transmission.

References Cited in the file of this patent

UNITED STATES PATENTS

| | | |
|---|---|---|
| 2,568,007 | Jandasek | Sept. 18, 1951 |
| 2,682,787 | Holdeman | July 6, 1954 |
| 2,930,257 | Christenson | Mar. 29, 1960 |
| 2,950,633 | Goodrich | Aug. 30, 1960 |
| 3,039,327 | Breting | June 19, 1962 |